(12) United States Patent
Miyamoto

(10) Patent No.: US 8,859,642 B2
(45) Date of Patent: *Oct. 14, 2014

(54) CURABLE COMPOSITION, CURED ARTICLE OBTAINED THEREFROM AND PROCESS FOR PREPARATION OF THE SAME

(75) Inventor: Masahiro Miyamoto, Settsu (JP)

(73) Assignee: Kaneka Corporation, Osaka (JP)

( * ) Notice: Subject to any disclaimer, the term of this patent is extended or adjusted under 35 U.S.C. 154(b) by 220 days.

This patent is subject to a terminal disclaimer.

(21) Appl. No.: 13/144,424

(22) PCT Filed: Jan. 13, 2010

(86) PCT No.: PCT/JP2010/000142
§ 371 (c)(1),
(2), (4) Date: Jul. 13, 2011

(87) PCT Pub. No.: WO2010/082482
PCT Pub. Date: Jul. 22, 2010

(65) Prior Publication Data
US 2011/0269894 A1    Nov. 3, 2011

(30) Foreign Application Priority Data

| Jan. 15, 2009 | (JP) | ................................ | 2009-006545 |
| Feb. 25, 2009 | (JP) | ................................ | 2009-042599 |
| Jun. 22, 2009 | (JP) | ................................ | 2009-147312 |
| Jul. 6, 2009 | (JP) | ................................ | 2009-160022 |
| Aug. 6, 2009 | (JP) | ................................ | 2009-183571 |

(51) Int. Cl.
*C08K 9/08* (2006.01)
*C08F 2/24* (2006.01)
*C09J 4/06* (2006.01)

(52) U.S. Cl.
CPC ... *C08F 2/24* (2013.01); *C08K 9/08* (2013.01); *C09J 4/06* (2013.01)
USPC .......................................... 523/201; 524/533

(58) Field of Classification Search
USPC .......................................... 523/201; 524/533
See application file for complete search history.

(56) References Cited

U.S. PATENT DOCUMENTS

| 3,218,305 | A | | 11/1965 | Krieble | |
| 4,034,013 | A | * | 7/1977 | Lane | ............................. 524/513 |
| 4,536,546 | A | | 8/1985 | Briggs | |
| 4,937,173 | A | | 6/1990 | Kanda et al. | |
| 4,942,201 | A | * | 7/1990 | Briggs et al. | ..................... 525/71 |
| 7,275,178 | B2 | | 9/2007 | Inoue et al. | |
| 2004/0077766 | A1 | * | 4/2004 | De Cooman et al. | ......... 524/458 |
| 2005/0144500 | A1 | | 6/2005 | Inoue et al. | |
| 2006/0240198 | A1 | | 10/2006 | Tanikawa et al. | |
| 2008/0302479 | A1 | | 12/2008 | Barker et al. | |
| 2009/0093562 | A1 | | 4/2009 | Tanikawa et al. | |
| 2009/0134358 | A1 | | 5/2009 | Tanikawa et al. | |
| 2012/0208000 | A1 | * | 8/2012 | Yoshioka et al. | ............. 428/220 |

FOREIGN PATENT DOCUMENTS

| CA | 1192688 A1 | 8/1985 |
| JP | 61-162501 A | 7/1986 |
| JP | 62-43412 A | 2/1987 |
| JP | 04-275204 A | 9/1992 |
| JP | 05-306379 A | 11/1993 |
| JP | 10-237420 A | 9/1998 |
| JP | 2000-178398 A | 6/2000 |
| JP | 2001-81114 A | 3/2001 |
| JP | 2001-220525 A | 8/2001 |
| JP | 2001-247793 A | 9/2001 |
| JP | 2005-015757 A | 1/2005 |
| JP | 2006-089627 A | 4/2006 |
| JP | 2007-002046 A | 1/2007 |
| JP | 2007-238732 A | 9/2007 |
| JP | 2009-62400 A | 3/2009 |
| WO | 2007/068625 A1 | 6/2007 |
| WO | 2008/069656 A1 | 6/2008 |

OTHER PUBLICATIONS

Machine translation of JP 2007-002046 A, Jan. 11, 2007.*
International Search Report for PCT/JP2010/000142, mailing date of Apr. 20, 2010.

* cited by examiner

*Primary Examiner* — Vickey Nerangis
(74) *Attorney, Agent, or Firm* — Westerman, Hattori, Daniels & Adrian, LLP

(57) ABSTRACT

Fine polymer particles are dispersed as primary particles in a vinyl monomer to provide a high quality composition in which the dispersed state and stability of the particles are regulated to a high degree and to provide a curable composition being excellent in handleability and using fine polymer particles as a toughness-imparting agent. For the above, the curable composition of the present invention comprises 100 parts by weight of a vinyl monomer (A) and 0.1 to 100 parts by weight of fine polymer particles (B) having a volume average particle size of 0.05 to 1 m, in which the fine polymer particles (B) are dispersed in the form of primary particles in the vinyl monomer (A).

16 Claims, No Drawings

CURABLE COMPOSITION, CURED ARTICLE OBTAINED THEREFROM AND PROCESS FOR PREPARATION OF THE SAME

TECHNICAL FIELD

The present invention relates to a curable resin material modified with fine polymer particles, a curable resin composition and a cured resin article which can be obtained by curing them.

BACKGROUND ART

Vinyl monomers such as (meth)acrylate monomers, aromatic vinyl monomers and vinyl ether monomers are widely used as a curable material for an adhesive, a resin syrup, a dental resin, a coating material and a photocurable material. Technologies of mixing commercially available core/shell type fine polymer particles in powder form to the above-mentioned monomers for improving toughness are disclosed in JP-A-4-275204 (Patent Document 1) and Canadian Patent Publication No. 1192688 (Patent Document 2).

It is well known that one particle of such a core/shell polymer in powder form is an aggregate of about several tens m to several hundreds m obtained by aggregating plural core/shell fine polymer particles, for example, plural core/shell fine polymer particles formed to have a primary particle size of about 0.1 m to about 1 m.

When such a core/shell polymer in powder form is mixed to a curable composition comprising a vinyl monomer as a main component by forcedly applying a mechanical shearing force, apparently it can be in a state of being mixed to the composition, but actually the core/shell polymer cannot be dispersed in the form of primary particle and most of the primary particles are present in the vinyl monomer in an aggregated state. In most cases, such a curable composition before cured does not have a viscosity sufficient for transmitting a strong mechanical shearing force to the core/shell polymer being present as an aggregate, and as a result, the core/shell polymer is not in a state of primary particles and is left in the form of an aggregate. In addition, a method for accelerating dispersion of a core/shell polymer by applying heat to a curable composition for avoiding an undesired curing reaction and quality degradation is accompanied by many limitations. Such being the case, graft rubber particles (core/shell polymer) in powder form have been used in a state of being insufficiently dispersed in a curable composition (thermosetting resin), especially in low viscosity vinyl monomers, namely, in a state of being left in the form of an aggregate.

It is well known that in the case of a thermoplastic resin in which a core/shell polymer is easily dispersed in the form of primary particles, the core/shell polymer exhibits a high effect of improving toughness. Therefore, it has been desired that a core/shell polymer is dispersed in the form of primary particles also in the case of improving toughness of a thermosetting resin, namely, a curable composition by using a core/shell polymer. However, while a preferred state of a core/shell polymer before mixed has been proposed in the prior arts, in the light of the above-mentioned technical restrictions, actually it has been extremely difficult to mix a core/shell polymer in a vinyl monomer, to realize a stably dispersed state of the core/shell polymer in the form of primary particles and further to keep this state. Such a problem appears remarkably in the case of using a vinyl monomer selected from the group consisting of a (meth)acrylate monomer obtained from an alcohol having 3 or more carbon atoms and (meth)acrylic acid, an aromatic vinyl monomer and a vinyl ether monomer.

By the way, (meth)acrylic adhesives have been used as adhesives for structural adhesive in a variety of industrial applications since they exhibit an adhesive strength in a short period of time, and for example, have characteristics such as a wide range of allowable mixing ratio of each component, a rapid curing at low temperature and easy handling as compared with epoxy resin adhesives. Thus, (meth)acrylic adhesives are very useful since they can replace conventional riveting and welding by adhesion and can joint materials which have been difficult to joint by riveting and welding, such as jointing of plastic with metal.

For example, Patent Document 3 discloses an acrylic adhesive comprising a (meth)acrylate monomer, a radical polymerization initiator, a mixture of chlorosulfonated polyethylene or sulfonyl chloride and chlorinated polyethylene, and a graft copolymer, and further, there is described that the adhesive preferably comprises a (meth)acrylic acid and an initiator and that a preferred graft copolymer is a core/shell copolymer obtained by grafting MBS or an acrylic rubber with (meth)acrylic acid ester.

Also, Patent Document 4 discloses a two-component adhesive composition having high safety and excellent adhesion and storage stability and comprising:
(1) a (meth)acrylic monomer,
(2) a mixture of chlorosulfonated polyethylene or sulfonyl chloride and chlorinated polyethylene,
(3) an organic peroxide,
(4) a carboxyl group-containing monomer obtained by a reaction of hydroxyalkyl acrylate or hydroxyalkyl methacrylate having an alkylene group having 2 to 4 carbon atoms with polycarboxylic acid or carboxylic anhydride,
(5) a monofunctional epoxy compound,
(6) an antioxidant, and
(7) an amine based activator.

As shown in the above-mentioned Patent Document 3 and Patent Document 4, generally these acrylic adhesives comprise various rubber-like polymers such as chloroprene, styrene/butadiene block copolymer, chlorosulfonated polyethylene and a core/shell polymer having a core of rubber polymer.

Such rubber-like polymers contained in acrylic adhesives are classified into un-crosslinked rubber polymers being soluble in (meth)acrylate monomers, namely, soluble elastomers such as chloroprene, styrene/butadiene block copolymer and chlorosulfonated polyethylene and crosslinked rubber polymers being insoluble in (meth)acrylate monomers such as graft copolymers represented by a core/shell polymer, namely, insoluble elastomers.

A core/shell polymer which is an insoluble elastomer used in Patent Document 3 is one commercially available in powder form, and this core/shell polymer in powder form is added and mixed with an acrylic monomer which is a main component of an acrylic adhesive, to obtain an acrylic adhesive.

It is known that generally such a core/shell polymer is added as an impact resistance improving agent to a thermoplastic resin, and is dispersed in a state of primary particles in a thermoplastic resin by applying a high shearing force during mold-processing, thereby effectively exhibiting an effect of improving toughness of the resin.

By the way, anaerobic cured products such as an anaerobic adhesive and sealing agent are known as one-component curable composition which can be present stably for a long period of time while being kept in contact with air, but immediately starts curing and completes curing in a given period of time once contact with air is cut off for actual use. Examples of such anaerobic adhesives are disclosed in Patent Document 5.

Further, in Patent Document 6, with respect to a liquid gasket to be used for portions requiring sealing property in the field of automobile parts, etc., there is disclosed an anaerobic curable sealing agent comprising urethane(meth)acrylate prepolymer, a radically polymerizable monomer, an organic peroxide, and further core/shell fine particles comprising a core of rubber-like polymer and a shell of glassy polymer as an anaerobic curable sealing agent composition which is excellent in oil resistance and flexibility and does not lose flexibility even for the use under high temperature atmosphere, and it is described that such a sealing agent is excellent in repellency for maintaining flexibility and sealing property sufficient for coping with vibration of a sealing member and external force and have good adhesion on an oily surface.

Namely, the core/shell fine particles in Patent Document 6 are particles of a core/shell polymer and are commercially available as powder form, and the core/shell polymer in powder form is mixed to an anaerobic adhesive to obtain an anaerobic curable composition comprising the core/shell polymer.

It is known that generally such a core/shell polymer in powder form is added as an impact resistance improving agent to a thermoplastic resin, and is dispersed in a state of primary particles in a thermoplastic resin by applying a high shearing force during mold-processing, thereby effectively exhibiting an effect of improving toughness of the resin.

As mentioned above, a core/shell polymer in powder form has been mixed to a (meth)acrylate monomer to be used in a state of paste. However, in this case, core/shell particles could not be dispersed in the form of primary particles and were used as they were. The mixture can be apparently in a mixed state, but actually a core/shell polymer cannot be dispersed in the form of primary particles and most of primary particles are present in a vinyl monomer in an aggregated state. It is well known that in a thermoplastic resin in which a core/shell polymer is easily dispersed in the form of primary particles, a core/shell polymer exhibit a high effect of improving toughness, and it is important to disperse a core/shell polymer in the form of primary particles. However, in prior arts, a proposal on a preferred state of a core/shell polymer before mixing has been made, but it has been extremely difficult to actually mix a core/shell polymer to a vinyl monomer to realize a state of being stably dispersed in the form of primary particles and further to maintain this state.

In the light of such a technical background as mentioned above, in an anaerobic acrylic adhesive composition comprising a core/shell polymer, since the core/shell polymer was in an aggregated state and was not dispersed in the form of primary particles, inherent performance thereof could not be exhibited and in this point, there was room for improvement.

By the way, photocurable adhesives have been used for assembly of various industrial materials because they function as an adhesive to be rapidly cured by irradiation of ultraviolet ray, etc. and also have been widely used industrially as excellent adhesives since articles to be adhered can be fixed in a short period of time and an energy amount necessary for curing is small.

Patent document 7 discloses a technique of using a photocurable resin composition comprising core/shell fine resin particles comprising a core particle having elasticity of rubber and a shell layer formed on the core particle surface in the photocurable resin, as a sealing agent and a sealing material having improved adhesion with a glass substrate.

PRIOR ART DOCUMENTS

Patent Documents

Patent Document 1: JP-A-4-275204
Patent Document 2: Canadian Patent Publication No. 1192688
Patent Document 3: U.S. Pat. No. 4,536,546
Patent Document 4: JP-A-05-306379
Patent Document 5: U.S. Pat. No. 3,218,305
Patent Document 6: JP-A-10-237420
Patent Document 7: JP-A-2005-015757

DISCLOSURE OF INVENTION

Problem to be Solved by the Invention

The present invention was made for the purpose of performing monodispersion, namely, primary dispersion of fine polymer particles in a vinyl polymer (A), which has been difficult in prior arts, and further, it is an object of the present invention to provide a high quality composition in which a dispersed state and stability of the particles are highly regulated and to provide a cured article obtained from the composition.

Means to Solve the Problem

As a result of a diligent investigation, the inventors have discovered a technology such that by use of a curable composition having a specific configuration, a dispersed state and stability of fine polymer particles in a vinyl monomer can be highly regulated and a high quality composition and a cured article obtained from the composition can be provided, and have completed the present invention.

Namely, the present invention relates to a curable composition comprising 100 parts by weight of a vinyl monomer (A) and 0.1 to 100 parts by weight of fine polymer particles (B) having a volume average particle size of 0.05 to 1 m, wherein the fine polymer particles (B) are dispersed in a state of primary dispersion in the vinyl monomer (A).

A preferred embodiment is such that in the above-mentioned curable composition, the fine polymer particles (B) are contained in an amount of 0.1 to 45 parts by weight based on 100 parts by weight of the vinyl monomer (A).

A preferred embodiment is such that an active oxygen concentration in the above-mentioned curable composition is 50 ppm, more preferably less than 20 ppm, thereby making an excellent mechanical strength of a cured article obtained from the composition, substantially inhibiting quality degradation of the vinyl monomer (A) due to impurities derived from the fine polymer particles (B), and providing a stable curable composition having good storage life and assuring stability of the vinyl monomer (A).

Namely, for obtaining a composition comprising a vinyl monomer (A) and fine polymer particles (B), so far the use of a mixing method necessitating high temperature condition and long-term application of high shearing force could not be avoided for obtaining an even more finely dispersed state of the fine polymer particles (B) to an extent to be close to primary particles. Therefore, it has been difficult to prevent degradation and undesired polymerization of the vinyl monomer (A) and further to avoid lowering of storage life attributable thereto.

As a result of an extensive investigation, the inventors have found that in order to obtain a stable curable composition comprising the fine polymer particles (B) being dispersed in the form of primary particles in the vinyl monomer (A) and having good storage life, it is necessary to use a specific curable composition and set an active oxygen concentration in the composition to be less than a specific amount.

A preferred embodiment is such that the vinyl monomer (A) is at least one selected from the group consisting of a (meth)acrylate monomer synthesized from an alcohol having 3 or more carbon atoms and (meth)acrylic acid, hydroxyethyl (meth)acrylate, an aromatic vinyl monomer and a vinyl ether monomer.

A preferred embodiment is such that the fine polymer particles (B) are particles of a core/shell graft copolymer comprising at least two layers of an elastic core layer being present inside thereof and a shell layer being present at an outermost side thereof, and the elastic core layer comprises a rubber-like polymer having a glass transition temperature lower than 0 C.

A preferred embodiment is such that the shell layer comprises a copolymer of 100 wt % in total of shell layer monomers comprising 2 to 90 wt % of at least one monomer (BS-1) selected from the group consisting of an alkoxyalkyl(meth) acrylate, hydroxyalkyl(meth)acrylate and glycidyl(meth) acrylate, 2 to 98 wt % of at least one monomer (BS-2) selected from the group consisting of an alkyl(meth)acrylate, styrene, -methylstyrene and (meth)acrylonitrile, 0 to 10 wt % of a polyfunctional vinyl monomer (BS-3), and 0 to 10 wt % of other vinyl monomer (BS-4) being copolymerizable with those monomers.

A preferred embodiment is such that the shell layer monomer is a monomer mixture comprising styrene as an essential component.

The present invention also relates to a cured article obtained by curing the curable composition of the present invention.

The present invention further relates to a (meth)acrylic adhesive composition comprising the curable composition of the present invention, 2 to 50 parts by weight of an elastomer being soluble in the vinyl monomer (A), an ethylenically unsaturated carboxylic acid compound and a radical polymerization initiator, wherein the vinyl monomer (A) comprises, as main component, at least one (meth)acrylate monomer selected from the group consisting of a (meth)acrylate monomer synthesized from an alcohol having 3 or more carbon atoms and (meth)acrylic acid and hydroxyethyl(meth) acrylate.

In the (meth)acrylic adhesive composition of the present invention, the fine polymer particles (B) comprising a core/shell polymer is stably dispersed in the form of primary particles in the composition, for example, in the (meth)acrylate monomer (A) without application of a high shearing force, and an effect of improving a mechanical strength by each primary particle of the core/shell polymer can be exhibited sufficiently, and therefore, the cured article obtained from the composition is excellent in toughness.

A preferred embodiment is such that the vinyl monomer (A) comprises, as a sub-component, a (meth)acrylate monomer synthesized from an alcohol having one or more and two or less carbon atoms and (meth)acrylic acid.

The present invention further relates to an anaerobic adhesive composition comprising the curable composition of the present invention, 0.01 to 12 parts by weight of a hydroperoxide type organic peroxide, 0.01 to 10 parts by weight of an organic sulfimide compound, 0.01 to 3 parts by weight of an amine compound and 0 to 0.2 part by weight of a polymerization inhibitor, wherein the amine compound is at least one selected from the group consisting of N,N-disubstituted arylamines and hydrogenated products of heterocyclic secondary amines, and the polymerization inhibitor is at least one selected from the group consisting of quinones and phenols.

The anaerobic adhesive composition of the present invention is a composition comprising a specific curable composition as a main component, and the fine polymer particles of a core/shell polymer are stably dispersed in the form of primary particles in the vinyl monomer (A) of the composition without application of a high shearing force. Therefore, an effect of improving a mechanical strength by each primary particle of the core/shell polymer can be exhibited, and the cured article obtained from the composition is excellent in toughness, and the anaerobic adhesive composition is suitably used, for example, as an adhesive and a sealing agent.

A preferred embodiment of the anaerobic adhesive composition is such that the vinyl monomer (A) comprises at least one (meth)acrylate monomer selected from the group consisting of a (meth)acrylate monomer synthesized from an alcohol having 3 or more carbon atoms and (meth)acrylic acid and hydroxyethyl(meth)acrylate.

The present invention further relates to a photocurable adhesive composition comprising the curable composition of the present invention.

The photocurable adhesive composition of the present invention is a composition comprising a specific curable composition as a main component, and the fine polymer particles of a core/shell polymer are stably dispersed in the form of primary particles in the vinyl monomer (A) of the composition without application of a high shearing force. Therefore, an effect of improving a mechanical strength by each primary particle of the core/shell polymer can be exhibited, and the cured article obtained from the composition is excellent in an adhesive strength.

Namely, it was found that an excellent photocurable adhesive composition can be prepared by using a vinyl monomer composition in which fine polymer particles of a core/shell polymer are stably dispersed in the form of primary particles.

In Patent Document 7, commercially available core/shell type polymer particles in the form of powder are used as fine polymer particles, namely, as core/shell type fine polymer particles, and a preferred particle size of the core/shell type fine polymer particles is disclosed. However, there is neither disclosure nor suggestion as to a dispersed state of the core/shell type fine polymer particles and a particle size of the dispersed particles in the photocurable resin composition disclosed in Patent Document 7.

Namely, as mentioned above, in the case of preparing an acrylic adhesive or an anaerobic adhesive by adding a core/shell type polymer in the form of powder to, for example, an acrylic monomer which is a main component of an acrylic adhesive or a component of an anaerobic adhesive, or in the case of preparing a photocurable adhesive by adding and mixing a core/shell type polymer in the form of powder to a vinyl monomer, for example, a (meth)acrylate monomer to obtain a mixture in the liquid or paste form and then blending necessary components to the mixture, a mixture in the paste form is obtained by adding and mixing a core/shell type polymer in the liquid or powder form to a (meth)acrylate monomer. In such a mixture in the paste form, a core/shell type polymer is not dispersed in the form of primary particles, and most of the core/shell type polymer is present in the (meth)acrylate monomer in the form of aggregate formed by aggregation of primary particles of the polymer. Such a mixture paste which is a thermosetting composition is cured as it is without such application of a high shearing force at mold-processing as in the above-mentioned thermoplastic resin composition.

Namely, so far, a mixture in the paste form obtained by adding and mixing a core/shell type polymer in the form of powder to a (meth)acrylate monomer has been used, and in this case, core/shell type particles could not be dispersed in the form of primary particles, and was used in a state of an aggregate. The mixture can be apparently in a mixed state, but actually a core/shell type polymer cannot be dispersed in the form of primary particles and most of primary particles are present in a vinyl monomer in an aggregated state.

However, in prior arts, proposals on a preferred state of a core/shell polymer before mixing have been made, but actually it has been extremely difficult to mix a core/shell type polymer to a vinyl monomer to realize a state of being stably dispersed in the form of primary particles and further maintain this state.

As mentioned above, conventional acrylic adhesive compositions, anaerobic adhesive compositions and photocurable adhesive compositions comprising a core/shell type polymer and cured articles obtained therefrom comprise the core/shell type polymer in a state of aggregated primary particles, and therefore, inherent performance of each primary particle of the core/shell type polymer could not be exhibited and in this point, there was room for improvement.

In the thermosetting compositions such as the mentioned acrylic adhesive compositions, anaerobic adhesive compositions and photocurable adhesive compositions, it has been difficult to apply a high shearing force to the composition for improving dispersibility of a core/shell type polymer as compared with heat forming of a thermoplastic composition.

In the light of the situation mentioned above, the present invention was made to provide an acrylic adhesive composition, an anaerobic adhesive composition and a photocurable adhesive composition which have excellent quality, sufficiently exhibit an effect of improving a mechanical strength of each primary particle of a core/shell type polymer, and are modified with core/shell type fine polymer particles, and these compositions could not be obtained by conventional techniques.

As a result of an extensive investigation, it was found that excellent adhesive compositions such as an acrylic adhesive composition, an anaerobic adhesive composition and a photocurable adhesive composition can be obtained by using a vinyl monomer composition in which the fine polymer particles (B) of a core/shell type polymer are dispersed in the form of primary particles.

The present invention further relates to a cured article obtained by curing the (meth)acrylic adhesive composition, anaerobic adhesive composition or photocurable adhesive composition of the present invention, in which the fine polymer particles (B) are dispersed in the form of primary particles in the cured article.

The present invention further relates to a process for preparing a curable composition comprising, in order:
a first step for preparing an aggregate of the fine polymer particles (B) by slow aggregation, a second step for preparing a dispersion by dispersing the fine polymer particles (B) in an organic solvent, and a third step for preparing a curable composition, wherein the third step comprises, in order, an operation for adding the vinyl monomer (A) to the organic dispersion of fine polymer particles obtained in the second step, and an operation for removing the organic solvent, and the operation for removing the organic solvent in the third step is carried out under gas atmosphere comprising an inert gas and oxygen and having an oxygen content of 2 to 8 vol %.

A preferred embodiment is such that the organic solvent having a boiling point of lower than 60 C is used.

A preferred embodiment is such that a pressure of the gas atmosphere comprising an inert gas and oxygen is 260 to 650 mmHg.

A preferred embodiment is such that the operation for removing the organic solvent is carried out mainly at 20 C to 51 C.

Effect of the Invention

In the curable composition of the present invention, it is possible to highly regulate a dispersed state and stability of the fine polymer particles while dispersing the fine polymer particles in the form of primary particles in the vinyl polymer, and therefore, a cured article having improved quality, for example, sufficient toughness with inherent properties of the resin being maintained is obtained.

EMBODIMENT FOR CARRYING OUT THE INVENTION (Curable Composition)

The curable composition of the present invention is a curable composition comprising 100 parts by weight of the vinyl monomer (A) and 0.1 to 100 parts by weight, preferably 0.1 to 45 parts by weight of the fine polymer particles (B) having a volume average particle size of 0.05 to 1 m, in which the fine polymer particles (B) are dispersed in the form of primary particles in the vinyl monomer (A), and therefore, the cured article comprising the curable composition has toughness and hardness being compatible with each other.

Preferably the curable composition is characterized in that an active oxygen concentration in the curable composition is less than 50 ppm. Therefore, not only the cured article obtained from the composition has an excellent mechanical strength with toughness and hardness being compatible with each other, but also quality deterioration of the vinyl monomer (A) due to impurities derived from the fine polymer particles (B) is substantially inhibited, and there is provided the stable curable composition having good storage life and assuring stability by inhibiting deterioration of the vinyl monomer (A).

As mentioned above, the curable composition of the present invention is required to comprise 0.1 to 100 parts by weight of the fine polymer particles (B) based on 100 parts by weight of the vinyl monomer (A). When the content of fine polymer particles (B) is less than 0.1 part by weight, effects of the present invention may vary widely, and when it exceeds 100 parts by weight, a viscosity of the composition becomes too high and there may be a problem with handling of the composition. From the viewpoint of balancing toughness and hardness of the cured article and obtaining a viscosity making easy handling of the composition, the content is preferably from 0.1 to 70 parts by weight. An industrially preferred embodiment is such that the curable composition of the present invention is prepared so that the content of fine polymer particles (B) is more preferably from 17 to 70 parts by weight, further preferably from 15 to 45 parts by weight, especially preferably from 15 to 30 parts by weight, and if necessary, dilution is optionally carried out.

In the present invention, a primary particle size of the fine polymer particles (B) is within a range from 0.05 to 1 m. Further, in the composition of the present invention, the fine polymer particles (B) are dispersed in the form of primary particles in the continuous phase of the vinyl monomer (A), namely, (B) is dispersed in (A) at a particle size of 0.05 to 1 m.

In addition, the fine polymer particles (B) may swell in the vinyl monomer component (A) but is not dissolved therein. Further, it is preferable that the fine polymer particles (B) are particles of a polymer having a crosslinked structure so as not to dissolve in a good solvent therefor and lose the form of fine particles even though swelling in the solvent occurs. It can be confirmed that the fine polymer particles (B) are dispersed in the form of primary particles (hereinafter also referred to as primary dispersion) in the continuous phase of the vinyl monomer (A), by measuring a particle size of the dispersed particles, for example, by measuring a particle size of the fine polymer particles (B) in the composition of the present invention with a particle size measuring device using light scattering. Or, it can be judged as a matter of course that the fine polymer particles (B) are dispersed in the form of primary particles even before the curing, when the dispersion in the form of primary particles is confirmed by curing the composition of the present invention or a blend comprising the composition by a proper method and then observing by means of an optical method using an image of a transmission type electron microscope or the like. Herein, to be dispersed in the form of primary particles means that a particle dispersion ratio explained infra is not less than 90%.

Also, "stable dispersion" of the fine polymer particles (B) means that the fine polymer particles (B) are dispersed under stationary normal conditions for a long period of time without undergoing aggregation, separation and sedimentation in the vinyl monomer (A), and it is preferable that the distribution of the fine polymer particles (B) in the vinyl monomer (A) does not change substantially and "stable dispersion" can be maintained even if the composition of the present invention is heated within a range being free of a danger to decrease the viscosity of the composition and is stirred.

The (meth)acrylic adhesive composition of the present invention is one comprising the curable composition of the present invention comprising 100 parts by weight of the vinyl monomer (A), 2 to 50 parts by weight of the elastomer being soluble in the vinyl monomer (A), the ethylenically unsaturated carboxylic acid compound and the radical polymerization initiator, and is characterized in that the fine polymer particles (B) are dispersed in the form of primary particles in the vinyl monomer (A).

The anaerobic adhesive composition of the present invention is one comprising the curable composition of the present invention comprising 100 parts by weight of the vinyl monomer (A), 0.01 to 12 parts by weight of the hydroperoxide type organic peroxide, 0.01 to 10 parts by weight of the organic sulfimide compound, 0.01 to 3 parts by weight of the amine compound and 0 to 0.2 part by weight of the polymerization inhibitor, and is characterized in that the fine polymer particles (B) are dispersed in the form of primary particles in the vinyl monomer (A).

It is necessary that the anaerobic adhesive composition of the present invention is not polymerized while being kept in contact with air, and is polymerized immediately after contact with air is cut off. Therefore, the amine compound is required to be at least one selected from the group consisting of N,N-disubstituted arylamines and hydrogenated products of heterocyclic secondary amines, and the polymerization inhibitor is required to be at least one selected from the group consisting of quinones and phenols.

When the amounts of organic sulfimide compound and organic peroxide are excessively less than the above-mentioned range, there is a case where anaerobic curability is not exhibited, and when the amounts are excessively larger than the above-mentioned range, there is a high possibility of causing lowering of storage life of the adhesive composition of the present invention and undesired spontaneous polymerization. Therefore, any of these cases are not preferred. Further, when the amount of polymerization inhibitor is excessively less than the above-mentioned range, there is a high possibility of causing lowering of storage life of the adhesive composition of the present invention and undesired spontaneous polymerization, and when the amount is excessively larger than the above-mentioned range, there is a case where an inhibiting action is strong and curing is inhibited. Therefore, these cases are not preferred.

The photocurable adhesive composition of the present invention is one comprising the curable composition of the present invention comprising 100 parts by weight of the vinyl monomer (A) and 0 to 12 parts by weight of the photopolymerization initiator, and is characterized in that the fine polymer particles (B) are dispersed in the form of primary particles in the vinyl monomer (A).

The photocurable adhesive composition of the present invention comprises, as mentioned above, 0 to 12 parts by weight of the photopolymerization initiator based on 100 parts by weight of the vinyl monomer (A). This photopolymerization initiator is a compound being capable of generating radicals when subjected to irradiation of active energy rays such as ultraviolet ray, visible light and electron beam and is also called a photoradical initiator, and a preferred content thereof is from 0 to 12 parts by weight. When curing the adhesive composition of the present invention with electron beam (EB), the adhesive composition of the present invention can be cured even without the photopolymerization initiator, and the initiator is not always necessary.

The photocurable adhesive composition of the present invention comprises, as mentioned above, a photopolymerization initiator and functions as an adhesive in such a way that the photopolymerization initiator generates free radicals, thereby causing a polymerization reaction (including a crosslinking reaction) of carbon-carbon double bond in the composition of the present invention to cure the composition. It is preferable to use a photosensitizer if necessary in addition to such a photopolymerization initiator.

In the present invention, in order to secure the above-mentioned primary dispersion, the vinyl monomer (A) comprises, as a main component, at least one (meth)acrylate monomer selected from the group consisting of a (meth)acrylate monomer synthesized from an alcohol having 3 or more carbon atoms and (meth)acrylic acid and hydroxyethyl (meth)acrylate. Namely, it is preferable that the amount of this (meth)acrylate monomer exceeds 50 wt % in the vinyl monomer (A), and in the case of preparing the anaerobic adhesive composition, the amount of this (meth)acrylate monomer is preferably 100 wt %.

In the composition of the present invention, from the viewpoint of maintaining the primary dispersion of the fine polymer particles (B) and adjusting the viscosity of the composition, it is preferable that the vinyl monomer (A) according to the present invention comprises, as a sub-component, a (meth)acrylate monomer synthesized from an alcohol having one or more and two or less carbon atoms and (meth)acrylic acid, namely, the amount of this (meth)acrylate monomer is less than 50 wt % in the vinyl monomer (A).

Examples of such a (meth)acrylate monomer synthesized from an alcohol having one or more and two or less carbon atoms and (meth)acrylic acid include methyl(meth)acrylate, ethyl(meth)acrylate, and the like.

As mentioned above, the (meth)acrylic adhesive composition, the anaerobic adhesive composition and the photocurable adhesive composition of the present invention are required to comprise 0.1 to 100 parts by weight of the fine polymer particles (B) based on 100 parts by weight of the vinyl monomer (A). When the content of the fine polymer particles (B) is less than 0.1 part by weight, effects of the present invention may vary widely, and when it exceeds 100 parts by weight, a viscosity of the composition becomes too high and there may be a problem with handling of the composition. The content of the fine polymer particles (B) is preferably from 0.1 to 45 parts by weight, more preferably from 1 to 40 parts by weight, further preferably from 2 to 40 parts by weight.

As mentioned above, it is preferable that the (meth)acrylic adhesive composition of the present invention comprises 2 to 50 parts by weight of the elastomer based on 100 parts by weight of the vinyl monomer (A). It is preferable that this elastomer is a thermoplastic elastomer dissolving in the vinyl monomer (A) and a preferred content thereof is from 2 to 40 parts by weight in that the elastomer together with the vinyl monomer (A) forms a part of a polymer chain constituting the cured article of the adhesive composition to exhibit a role of properly adjusting hardness and elongation of the adhesive composition of the present invention.

The (meth)acrylic adhesive composition of the present invention is, as mentioned above, required to comprise an ethylenically unsaturated carboxylic acid compound from the viewpoint of securing an adhesion strength at an interface with an article to be bonded and imparting interfacial peeling resistance, and the preferred content of the compound is from 1 to 20 parts by weight based on 100 parts by weight of the vinyl monomer (A).

The (meth)acrylic adhesive composition of the present invention comprises, as mentioned above, a radical polymerization initiator and functions as an adhesive in such a way that the radical polymerization initiator generates free radicals, thereby causing a polymerization reaction (including a crosslinking reaction) of carbon-carbon unsaturated double bond in the composition to cure the composition of the present invention. The preferred content of the initiator is from 0.05 to 5 parts by weight based on 100 parts by weight of the vinyl monomer (A) from the viewpoint of a balance between a storage stability of the adhesive composition and a curing speed. It is preferable to use a co-catalyst and a curing accelerator according to need in addition to such a radical polymerization initiator.

(Process for Preparing Curable Composition)

For dispersing the fine polymer particles (B) according to the present invention in the vinyl monomer (A) according to the present invention in such an embodiment satisfying the requirements of the present invention, various methods can be used as far as the requirements of the present invention are satisfied. For example, it is preferable to use the method described in WO2005/28546.

There are, for example, a method for bringing (B) obtained in the form of aqueous latex into contact with (A) and then removing unnecessary components such as water, a method for once extracting (B) in an organic solvent, mixing with (A) and then removing the organic solvent, and the like method as means for dispersing (B) in (A). In the operation for obtaining the composition of the present invention by removing unnecessary components including the above-mentioned organic solvent, it is preferable to use a method of executing the operation under gas atmosphere having an oxygen content of 2 to 8 vol %, which is a gas mixture comprising an inert gas and oxygen. The reason why the oxygen content of 2 to 8 vol % is used is that quality degradation of the vinyl monomer (A) such as unintended polymerization is prevented by making a dissolved oxygen amount in the vinyl monomer (A) sufficient and also because safety in industrial production is considered when mixing and dispersing (B) in (A). The oxygen content is more preferably from 2 to 6 vol %, especially preferably from 3 to 5 vol %. For example, under air atmosphere (oxygen content of about 21 vol %), a tendency of active oxygen being increased is recognized and is not preferable.

In the present invention, for dispersing the fine polymer particles (B) in the vinyl monomer (A) in such an embodiment satisfying the requirements of the present invention, it is preferable to use the method described in the above-mentioned WO2005/28546 while executing the dispersing under the above-mentioned gas mixture atmosphere having a specific oxygen content.

Specifically it is preferable that the curable composition of the present invention is prepared by the process comprising a first step for preparing an aggregate of the fine polymer particles (B) by slow aggregation, a second step for preparing a dispersion of the fine polymer particles (B), and a third step for preparing a curable composition.

It is preferable that the organic solvent used in the second step is one having a boiling point of lower than 60 C in which the effect of the present invention can be obtained effectively. It is possible to replace a part of the organic solvent used in this second step by the vinyl monomer component (A). In that case, a ratio of the organic solvent to the component (A) is not limited particularly, and from economical point of view, is preferably 90/10 to 0/100, more preferably 60/40 to 0/100. Further, it is preferable that the third step is carried out under atmosphere in which a pressure of the gas phase comprising an inert gas and oxygen is 260 to 650 mmHg, and thus, the effect of the present invention can be obtained effectively. Preferably the operation for removing the organic solvent is carried out mainly at 20 C to 51 C. Namely, the curable composition of the present invention can be prepared while preventing unintended polymerization of the vinyl monomer (A) and preventing generation of impurities.

Examples of the preferred inert gas include nitrogen, carbon dioxide, helium, neon, argon and the like. Preferably the composition of the present invention is prepared under light blocking condition.

Examples of the preferred organic solvent include methyl acetate, methylal and methyl formate. Also, it is possible to use pentane, t-butyl methyl ether or ethyl formate in combination.

The composition of the present invention obtained under the conditions mentioned above is characterized in that the active oxygen concentration thereof is less than 50 ppm. Preferably when the active oxygen concentration is less than 20 ppm, the composition of the present invention becomes stable and is excellent in storage life. The active oxygen concentration is further preferably less than 10 ppm, especially preferably less than 5 ppm.

(Cured Article)

The cured article of the present invention is one obtained by curing the above-mentioned curable composition of the present invention or the composition comprising it, in which since the fine polymer particles (B) are dispersed in the form of primary particles in the vinyl monomer (A) or in a matrix resin obtained by polymerization of a resin material comprising the vinyl monomer (A), compatibility of, for example, toughness with hardness is satisfied.

The cured article of the present invention includes cured articles obtained by curing the above-mentioned (meth)acrylic adhesive composition or anaerobic adhesive composition of the present invention, and since the fine polymer particles (B) are dispersed in the form of primary particles in the vinyl monomer (A) or in a matrix resin obtained by polymerization of a resin material comprising the vinyl monomer (A), when the cured article itself as an adhesive layer is broken, probability of the developing cracks colliding with more rubber particles becomes high and in addition, deformation absorbing more energy such as shear stress and craze easily arises and thus, high adhesion strength is exhibited.

(Vinyl Monomer (A))

An optional vinyl monomer can be used as the vinyl monomer (A) according to the present invention, and from the viewpoint of obtaining the stable curable composition of the present invention, the vinyl monomer is preferably at least one selected from the group consisting of a (meth)acrylate monomer synthesized from an alcohol having 3 or more carbon atoms and (meth)acrylic acid, hydroxyethyl(meth)acrylate, an aromatic vinyl monomer and a vinyl ether monomer.

The vinyl monomer (A) according to the present invention preferably comprises, as a main component, at least one (meth)acrylate monomer selected from the group consisting of a (meth)acrylate monomer synthesized from an alcohol having 3 or more carbon atoms and (meth)acrylic acid and hydroxyethyl(meth)acrylate, in order to secure the above-mentioned dispersibility of primary particles of the fine polymer particles (B) according to the present invention.

Especially preferred examples of the vinyl monomer (A) according to the present invention include (meth)acrylate having poly(alkylene glycol) structure; a (meth)acrylate monomer synthesized from an alcohol having 3 or more carbon atoms and 2 or more hydroxyl groups in its molecule and (meth)acrylic acid; and hydroxyethyl(meth)acrylate from the viewpoint of anaerobic polymerizability for obtaining the stable anaerobic adhesive composition of the present invention.

As mentioned above, it is preferable that in order to secure the above-mentioned dispersibility of primary particles of the fine polymer particles (B) according to the present invention, the vinyl monomer (A) in relation to the photocurable adhesive composition of the present invention comprises, as a main component, at least one monofunctional (meth)acrylate monomer selected from the group consisting of a (meth)acrylate monomer synthesized from an alcohol having 3 or more carbon atoms and (meth)acrylic acid, and hydroxyethyl(meth)acrylate, and/or a bifunctional or more polyfunctional (meth)acrylic acid ester.

Herein, the (meth)acrylic acid ester means an acrylic acid ester and/or a methacrylic acid ester.

((Meth)acrylate monomer synthesized from an alcohol having 3 or more carbon atoms and (meth)acrylic acid)

Examples of the (meth)acrylate monomer synthesized from an alcohol having 3 or more carbon atoms and (meth)acrylic acid include alkyl(meth)acrylates such as butyl(meth)acrylate, propyl(meth)acrylate, hexyl(meth)acrylate and isodecyl acrylate, and alicyclic(meth)acrylates such as cyclohexyl(meth)acrylate and isobornyl(meth)acrylate, and in addition, there are alkyloxy(meth)acrylates such as 2-methoxyethyl(meth)acrylate, 2-ethoxyethyl(meth)acrylate, ethoxyethoxyethyl(meth)acrylate, 2-phenoxyethyl(meth)acrylate and tetrahydrofurfuryl(meth)acrylate, hydroxyl group-containing (meth)acrylates such as 2-hydroxyethyl methacrylate, 2-hydroxypropyl(meth)acrylate and 4-hydroxybutyl(meth)acrylate, epoxy group-containing (meth)acrylates such as glycidyl(meth)acrylate, (meth)acrylates having ethylenically unsaturated double bond such as allyl(meth)acrylate, and the like.

Further, the above-mentioned (meth)acrylate monomer may be a vinyl monomer having a plurality of (meth)acrylate groups in its molecule. Examples of a vinyl monomer (A) having two (meth)acrylate groups include ethyleneglycol di(meth)acrylate, butanediol di(meth)acrylate, hexanediol di(meth)acrylate, cyclohexanedimethanol di(meth)acrylates and in addition, polyethylene glycol di(meth)acrylates such as triethyleneglycol di(meth)acrylate, tripropyleneglycol di(meth)acrylate, tetraethyleneglycol di(meth)acrylate, polyethylene glycol (200) di(meth)acrylate, polyethylene glycol (400) di(meth)acrylate and polyethylene glycol (600) di(meth)acrylate, and the like.

Also, examples of (A) having three (meth)acrylate groups include alkoxylated trimethylolpropane tri(meth)acrylates such as trimethylolpropane tri(meth)acrylate and trimethylolpropane triethoxytri(meth)acrylate, glycerol propoxy tri(meth)acrylate, pentaerythritol tri(meth)acrylate, tris(2-hydroxyethyl)isocyanurate tri(meth)acrylate, and the like.

Further, examples of (A) having four (meth)acrylate groups include pentaerythritol tetra(meth)acrylate, ditrimethylol propane tetra(meth)acrylate, and the like.

Further, examples of (A) having five (meth)acrylate groups include dipentaerythritol penta(meth)acrylate, and the like.

Further, examples of (A) having six (meth)acrylate groups include ditrimethylol propane hexa(meth)acrylate, and the like.

Among these (meth)acrylate monomers synthesized from an alcohol having 3 or more carbon atoms and (meth)acrylic acid, from the viewpoint of the frequency in industrial use, more preferred are isobornyl acrylate, isodecyl acrylate, tetrahydrofurfuryl acrylate, hexanediol diacrylate (HDODA), triethyleneglycol di(meth)acrylate, tripropyleneglycol diacrylate (TRPGDA), tetraethyleneglycol di(meth)acrylate, trimethylolpropane triacrylate (TMPTA), trimethylolpropane triethoxytri(meth)acrylate (TMPTETA), glycerol propoxy triacrylate (GPTA) and ditrimethylolpropane tetraacrylate (DTMPTA).

Also, hydroxyethyl(meth)acrylate is preferred as a component (A) from the viewpoint of the value in industrial use.

Also, in the anaerobic adhesive composition of the present invention, among these (meth)acrylate monomers, from the viewpoint of the frequency in industrial use, more preferred are polyethylene glycol di(meth)acrylates such as triethyleneglycol di(meth)acrylate, tripropyleneglycol di(meth)acrylate, tetraethyleneglycol di(meth)acrylate, polyethylene glycol (200) di(meth)acrylate, polyethylene glycol (400) di(meth)acrylate and polyethylene glycol (600) di(meth)acrylate, tetrahydrofurfuryl acrylate, hexanediol diacrylate (HDODA), triethyleneglycol di(meth)acrylate, tripropyleneglycol diacrylate (TRPGDA), tetraethyleneglycol di(meth)acrylate, trimethylolpropane triacrylate (TMPTA), trimethylolpropane triethoxytri(meth)acrylate (TMPTETA), hydroxyl group-containing (meth)acrylates such as 2-hydroxyethyl methacrylate, 2-hydroxypropyl(meth)acrylate and 4-hydroxybutyl(meth)acrylate, and hydroxyethyl(meth)acrylate.

Also, in the photocurable adhesive composition of the present invention, among the above-mentioned (meth)acrylate monomers, from the viewpoint of frequency in industrial use, more preferred are isobornyl acrylate, isodecyl acrylate, tetrahydrofurfuryl acrylate, phenoxyethyl acrylate, hydroxyethyl(meth)acrylate, hydroxypropyl(meth)acrylate, hexanediol diacrylate (HDODA), triethyleneglycol di(meth)acrylate, tripropyleneglycol diacrylate (TRPGDA), tetraethyleneglycol di(meth)acrylate, trimethylolpropane triacrylate (TMPTA), trimethylolpropane triethoxytriacrylate (TMPTETA), glycerol propoxy triacrylate and pentaerythritol triacrylate.

Examples of the aromatic vinyl monomers include styrene, -methylstyrene, alkylstyrene having alkyl groups having 1 to 12 carbon atoms, methoxystyrene, chlorostyrene, bromostyrene, divinylbenzene, phenylstyrene, vinyl naphthalene, and the like. Among these aromatic vinyl monomers, styrene is more preferred from the viewpoint of the frequency in industrial use.

Examples of the preferred vinyl ether monomer include those having one or more vinyl ether structures in its molecule and two or less vinyl groups in its molecule from the viewpoint of industrial availability. Examples of such a vinyl ether monomer include 1,4-butanediol divinyl ether, triethylene glycol divinyl ether, diethylene glycol divinyl ether, tetraethylene glycol divinyl ether, neopentyl glycol divinyl ether, cyclohexanedimethanol divinyl ether, butyl vinyl ether, cyclohexyl vinyl ether, ethylene glycol monovinyl ether, diethylene glycol monovinyl ether, 1,4-butanediol monovinyl ether, neopentyl glycol monovinyl ether, 2-chloroethyl vinyl ether, vinyl acetate, and the like. Among these vinyl ether monomers, triethylene glycol divinyl ether, tetraethylene glycol divinyl ether, butyl vinyl ether, cyclohexyl vinyl ether, 1,4-butanediol monovinyl ether and vinyl acetate are more preferred from the viewpoint of the frequency in industrial use.

Further, it is possible to optionally add a monomer component being copolymerizable with the above-mentioned (meth)acrylate monomer, aromatic vinyl monomer and vinyl ether monomer to the vinyl monomer (A) of the present invention. Examples of such a monomer component include a vinyl cyanide monomer, a (meth)acrylamide monomer, an allyl ester monomer, a vinyl ether monomer, and the like. Example of a vinyl cyanide monomer includes (meth)acrylonitrile, examples of a (meth)acrylamide monomer include (meth)acrylamide, N,N-dimethyl(meth)acrylamide and N-isopropyl(meth)acrylamide, example of an allyl ester monomer includes diallyl phthalate, and examples of a vinyl ether monomer include propanediol divinyl ether, butanediol divinyl ether, diethylene glycol divinyl ether, triethylene glycol divinyl ether, polyethylene glycol divinyl ether, and the like.

The vinyl monomer (A) according to the present invention may comprise an oligomer or a prepolymer of the vinyl monomers exemplified above to an extent not to impair the viscosity of the composition of the present invention and stable dispersibility of the fine polymer particles (B) according to the present invention in the vinyl monomer component (A).

(Other Vinyl Monomers)

In the present invention, further it is possible to use at least one (meth)acrylate monomer selected from the group consisting of (meth)acrylate monomers which are synthesized from an alcohol having one or more carbon atoms and (meth)acrylic acid and are not encompassed in (A), an aromatic vinyl monomer, a vinyl cyanide monomer, a (meth)acrylamide monomer or an allyl ester monomer, in the presence of the at least one (meth)acrylate monomer (A) selected from the group consisting of (meth)acrylate monomers synthesized from an alcohol having 3 or more carbon atoms and (meth)acrylic acid and hydroxyethyl(meth)acrylate.

Examples of such a (meth)acrylate monomer include methyl(meth)acrylate and ethyl(meth)acrylate. Similarly, examples of such an aromatic vinyl monomer include styrene, -methylstyrene, alkylstyrene having alkyl groups having 1 to 12 carbon atoms, methoxystyrene, chlorostyrene, bromostyrene, divinylbenzene, phenylstyrene, vinyl naphthalene, and the like. Among these aromatic vinyl monomers, styrene is more preferred from the viewpoint of the frequency in industrial use. Similarly, examples of such a vinyl cyanide monomer include (meth)acrylonitrile, and acrylonitrile is preferred from industrial point of view.

Further, examples of such a (meth)acrylamide monomer include (meth)acrylamide, N,N-dimethyl(meth)acrylamide and N-isopropyl(meth)acrylamide, and examples of an allyl ester monomer include diallyl phthalate, and the like.

(Fine Polymer Particles (B))

The fine polymer particles (B) according to the present invention are preferably fine polymer particles of a core/shell structure comprising at least two layers of an elastic core layer being present inside thereof and a shell layer being present at an outermost side thereof, and the elastic core layer comprises a rubber-like polymer having a glass transition temperature of lower than 0 C. More preferably the fine polymer particles (B) according to the present invention are fine polymer particles obtained by graft-polymerizing a graft-copolymerizable monomer component in the presence of an elastic core layer comprising such a rubber-like polymer to form a shell layer, and in this case, the fine polymer particles have a structure comprising an elastic core layer being present inside thereof and at least one shell layer provided on the surface of the elastic core layer to cover the whole or a part of the surface.

It is preferable that a ratio of the elastic core layer to the shell layer according to the present invention (mass ratio of the monomers forming the respective polymers) is within a range from 30/70 to 99/1, namely, the amount of polymer of the shell layer in the fine polymer particles (B) may be not less than an amount sufficient for satisfying the requirements of the present invention and the ratio is more preferably 60/40 to 90/10, further preferably 70/30 to 88/12. When the ratio of the elastic core layer to the shell layer is beyond the range of 30/70 and the proportion of the elastic core layer is decreased, the viscosity of the composition of the present invention becomes high and in some cases, handling of the composition becomes difficult. Also, when the ratio is beyond the range of 99/1 and the proportion of the shell layer is decreased, aggregation easily arises when handling the fine polymer particles and in some cases, there arises a problem with operability. In addition, there is a possibility that physical properties expected for the cured article obtained from the composition of the present invention cannot be obtained.

(Elastic Core Layer)

The elastic core layer according to the present invention is made of a rubber-like polymer having properties of a rubber and being capable of giving toughness to the cured article according to the present invention. In many cases, the elastic core layer is of a single layer structure, but may be of a multi-layer structure. When the elastic core layer has a multi-layer structure, the polymer compositions of each layer may be different from each other.

Such a rubber-like polymer according to the present invention preferably has a crosslinked structure, and in the case of such a crosslinked rubber polymer, this rubber-like polymer does not dissolve in the vinyl monomer (A) according to the present invention and also, does not dissolve in a good solvent therefor even though swelling in the solvent occurs.

The glass transition temperature (Tg) of the above-mentioned rubber-like polymer is preferably lower than 0 C, and from the viewpoint of increasing a toughness-imparting effect, is more preferably 20 C or lower, more preferably 45 C or lower.

The above-mentioned elastic core layer is usually in a spherical form, and in this case, the volume average particle size of the core portion of the elastic core layer in the fine polymer particles (B) is preferably within a range from 0.05 to 1 m, more preferably within a range from 0.05 to 0.6 m as far as the volume average particle size of the fine polymer particles (B) is within a range from 0.05 to 1 m. As mentioned above, since the core portion is preferably insoluble in the vinyl monomer (A), in that case, the particle size of the core portion can be easily confirmed by observing the cured article obtained from the composition of the present invention with a transmission electron microscope (TEM).

Such a rubber-like polymer is one obtained by polymerizing monomers for forming the rubber-like polymer, and depending on kind of a monomer becoming a main monomer, namely the first monomer, there are exemplified a diene rubber obtained by polymerizing mainly a conjugated diene monomer, an acrylic rubber obtained by polymerizing mainly (meth)acrylate monomer and a polysiloxane rubber. A combined rubber or composite rubber of these rubbers can be used, and from the viewpoint of cost, a diene rubber or an acrylic rubber is preferred. The monomers for forming the rubber-like polymer may further include an aromatic vinyl monomer and a vinyl cyanide monomer in addition to the above-mentioned first monomer.

In the case of an acrylic rubber, preferred first monomers are butyl acrylate and 2-ethylhexyl acrylate, and preferred first monomers for a diene rubber are butadiene, isoprene, and the like.

(Crosslinking of Elastic Core Layer)

In the elastic core layer according to the present invention, it is preferable that a crosslinked structure is introduced in the polymer component obtained by polymerizing the above-mentioned monomers. No particular constraint is imposed on the method for introducing the crosslinked structure, and methods generally used can be employed. For introducing a crosslinked structure to the polymer component obtained by polymerizing the above-mentioned monomers, for example, there is a method for adding, to a polymer component, a crosslinkable monomer such as polyfunctional monomers explained infra and then carrying out polymerization, and the like method. Specifically in the above-mentioned elastic core layer, a gel content thereof is preferably not less than 60 mass %, more preferably not less than 80 mass %, further preferably not less than 90 mass %, especially preferably not less than 95 mass %. Herein, the gel content means a ratio of an amount of an insoluble matter to the total amount of an insoluble matter and a soluble matter when about 1.2 g of a crumb obtained by coagulation and drying is immersed in 100 g of toluene and after allowing to stand at 23 C for 24 hours, the insoluble matter and the soluble matter are separated from each other.

(Polyfunctional Monomer)

The above-mentioned polyfunctional monomer does not include butadiene rubber, and examples thereof include allylalkyl(meth)acrylates such as allyl(meth)acrylate and allylalkyl(meth)acrylate; polyfunctional(meth)acrylates such as butanediol di(meth)acrylate, ethyleneglycol di(meth)acrylate, triethyleneglycol di(meth)acrylate and tetraethyleneglycol di(meth)acrylate; diallyl phthalate, triallyl cyanurate, triallyl isocyanurate, divinylbenzene, and the like. Especially preferred are allyl methacrylate, triallyl isocyanurate, butanediol di(meth)acrylate and divinylbenzene.

(Shell Layer)

The shell layer according to the present invention comprises a shell polymer undergoing a function of improving compatibility between the fine polymer particles (B) and the vinyl monomer (A) and enabling the fine polymer particles (B) to be dispersed in the form of primary particles in the curable composition of the present invention or the cured article obtained therefrom.

Such a shell polymer is preferably grafted on the elastic core layer. More precisely, it is preferable that the monomer component used for forming the shell layer is grafted with a core polymer for forming the elastic core layer, and the shell layer and the elastic core layer are chemically bonded to each other substantially. Namely, the shell polymer is formed preferably by undergoing graft polymerization of a monomer (mixture), which is a component constituting the shell polymer, in the presence of a core polymer, and thereby the shell polymer is graft-polymerized with the core polymer and covers a part or the whole of the core polymer. This polymerization operation is carried out by adding the monomer, which is a component constituting the shell polymer, to a latex of a core polymer prepared and being present in the form of aqueous polymer latex. The primary particle size of the thus obtained (B) is from 0.05 to 1 m. No particular constraint is imposed on the Tg of the polymer constituting the shell layer, and the Tg may be lower than 0 C.

Such a shell polymer is one prepared by polymerizing the monomers (BS) for forming the shell polymer, and from the viewpoint of effectively securing the above-mentioned dispersibility of primary particles, is preferably a copolymer of 100 wt % in total of the monomers (BS) for forming the shell polymer comprising 2 to 90 wt % of at least one monomer (BS-1) selected from the group consisting of an alkoxyalkyl (meth)acrylate, hydroxyalkyl(meth)acrylate and glycidyl (meth)acrylate, 2 to 98 wt % of at least one monomer (BS-2) selected from the group consisting of an alkyl(meth)acrylate, styrene, -methylstyrene and (meth)acrylonitrile, 0 to 10 wt % of a polyfunctional vinyl monomer (BS-3) and 0 to 10 wt % of other vinyl monomer (BS-4) being copolymerizable with those monomers.

Examples of a preferred combination of the monomers (BS) for forming the shell polymer include (1) a combination of an alkoxyalkyl(meth)acrylate as the monomer (BS-1) having an alkoxyalkyl group having 2 to 10 carbon atoms and at least one ether bond with oxygen atom and an alkyl(meth) acrylate as the monomer (BS-2) having an alkyl group having 2 to 10 carbon atoms, (2) a combination of hydroxyalkyl (meth)acrylate as the monomer (BS-1) having a hydroxyalkyl group having 2 to 10 carbon atoms and one hydroxyl group and an alkyl(meth)acrylate as the monomer (BS-2) having an alkyl group having 2 to 10 carbon atoms, and (3) a combination of an alkoxyalkyl(meth)acrylate (m-1) as the monomer (BS-1) having an alkoxyalkyl group having 2 to 10 carbon atoms and one ether bond with oxygen atom and (meth) acrylonitrile as the monomer (BS-2). In addition, it is preferable that styrene as the monomer (BS-2) is contained as an essential component in the monomers (BS) for forming the shell polymer especially from the viewpoint that while realizing that the fine polymer particles (B) are dispersed in the form of primary particles in the vinyl monomer (A), at the same time, the fine polymer particles (B) are prepared in the form of aqueous polymer latex without industrial difficulty, namely, the fine polymer particles (B) are obtained as an aqueous polymer latex being stable against a mechanical shearing force resulting from stirring and transfer with a pump.

With respect to the proportions of the monomer (BS-1), the monomer (BS-2), the polyfunctional vinyl monomer (BS-3) and the other vinyl monomer (BS-4) being copolymerizable with these monomers in the monomers (BS) for forming the shell polymer, it is preferable from the viewpoint of obtaining the curable composition having more stability that the monomers (BS) comprise 2 to 90 wt % of the monomer (BS-1), 2 to 98 wt % of the monomer (BS-2), 0 to 10 wt % of the polyfunctional vinyl monomer (BS-3) and 0 to 10 wt % of the other vinyl monomer (BS-4) being copolymerizable with these monomers. From the viewpoint of sufficiently preventing the above-mentioned swelling by introducing a crosslinked structure in the shell layer, it is more preferable that the monomers (BS) for forming the shell polymer comprise 0.1 to 5 wt % of the polyfunctional vinyl monomer (BS-3) as an essential component.

Preferred examples of the alkoxyalkyl(meth)acrylate in the monomer (BS-1) include 2-methoxyethyl(meth)acrylate, 4-methoxybutyl(meth)acrylate, 2-ethoxyethyl(meth)acrylate, tetrahydrofurfuryl(meth)acrylate and 2-phenoxyethyl (meth)acrylate.

Preferred examples of the hydroxyalkyl(meth)acrylate in the monomer (BS-1) include 2-hydroxypropyl(meth)acrylate and 4-hydroxybutyl(meth)acrylate.

Preferred examples of the alkyl(meth)acrylate having an alkyl group having 2 to 10 carbon atoms in the monomer (BS-2) include ethyl(meth)acrylate, butyl(meth)acrylate, t-butyl(meth)acrylate and cyclohexyl(meth)acrylate.

Preferred examples of the polyfunctional vinyl monomer (BS-3) include allyl(meth)acrylate, 1,3-butanediol di(meth) acrylate, diallyl phthalate, (poly)ethyleneglycol di(meth) acrylate, trimethylolpropane(tri)acrylate, triallyl isocyanurate and tris(2-hydroxyethyl)isocyanurate triacrylate.

Examples of the other vinyl monomer (BS-4) being copolymerizable with the monomers mentioned above include a (meth)acrylamide monomer, an ally ester monomer, an N-vinylamide monomer, and the like. Examples of the (meth) acrylamide monomer include (meth)acrylamide, N,N-dimethyl(meth)acrylamide and N-isopropyl(meth)acrylamide, example of the ally ester monomer includes diallyl phthalate, and examples of the N-vinylamide monomer include N-vinylpyrrolidone and N-vinyl caprolactam.

(Polymerization Inhibitor)

The curable composition of the present invention may comprise a polymerization inhibitor for the purpose of preventing undesired spontaneous polymerization and degradation of the vinyl monomer (A). Generally polymerization inhibitors which are added to commercially available radically polymerizable monomers can be used. Both of aerobic and anaerobic inhibitors can be used, and examples of the inhibitors include a phenol compound, an aromatic amine compound, a nitroxyl compound, a nitroso compound, a quinone compound, and the like. Concrete examples thereof include hydroquinone, MEHQ (hydroquinone monomethyl ether), catechol, t-butylcatechol, di-t-butylphenol, benzoquinone, phenothiazine, TEMPO (2,2,6,6-tetramethylpiperidine-1-oxyl), OH-TEMPO (4-hydroxy-2,2,6,6-tetramethylpiperidine-1-oxyl), vitamin C, vitamin E, phenylenediamine, Naugard available from Chemtura Corporation, Sumilizer available from Sumitomo Chemical Industry Co., Ltd., p-nitrosophenol, and the like.

In the case of forming the curable composition of the present invention into an anaerobic adhesive composition, the adhesive composition comprises at least one polymerization inhibitor selected from the group consisting of quinones and phenols in an amount of 0 to 2,000 ppm for the purpose of preventing an undesirable spontaneous polymerization reaction from arising before use and enabling the composition to be stored stably for a period of time practically causing no problem, and also for the purpose of adjusting a time interval after contact of the composition with air is cut off for use until an adhered portion is fixed by curing.

Examples of quinones include benzoquinone, naphthoquinone, and the like. Examples of the above-mentioned phenols include hydroquinone, hydroquinone monomethyl ether, t-butylhydroquinone, t-butylcatechol, and the like.

Elastomer being Soluble in Vinyl Monomer (A)

In the composition of the present invention, the elastomer being soluble in the vinyl monomer (A) is a thermoplastic elastomer being soluble in the above-mentioned vinyl monomer (A). Preferred examples of the elastomer being soluble in the vinyl monomer (A) according to the present invention include chlorosulfonated polyethylene, butadiene polymer, polychloroprene, chlorinated polyethylene, a copolymer of ethylene and acrylic acid ester, epichlorohydrine rubber, and the like, and from the viewpoint of adhesion properties and easy handling, chlorosulfonated polyethylene and a butadiene/acrylonitrile copolymer are preferred.

Example of usable chlorosulfonated polyethylene includes one having a bonded chlorine content of 25 to 70 wt % per 100 g of chlorosulfonated polyethylene and 3 to 160 mmol of chlorosulfonyl group. There is preferably exemplified, as a commercially available chlorosulfonated polyethylene, Hypalon (registered trademark) which is a product available from DuPont Performance Elastomers LLC.

Examples of usable butadiene polymer include a butadiene/styrene copolymer (including a random copolymer, a block copolymer and a graft copolymer), a butadiene/acrylonitrile copolymer, an acrylic ester butadiene rubber (a copolymer of butadiene and (meth)acrylic acid ester), and the like. A butadiene/acrylonitrile copolymer (NBR) is preferred from the viewpoint of easy dissolving in the vinyl monomer (A), and NBR having an acrylonitrile content of 5 to 45 wt % is preferred.

When using the elastomer as mentioned above, it is possible to use an organic compound having chlorosulfonyl group together according to need. Examples of the organic compound having chlorosulfonyl group include aromatic sulfonyl chlorides such as toluene sulfonyl chloride and diphenylether-4,4'-disulfonyl chloride and aliphatic sulfonyl chlorides such as methanesulfonyl chloride and butanesulfonyl chloride.

Ethylenically Unsaturated Carboxylic Acid Compound

Examples of ethylenically unsaturated carboxylic acid compound in the composition of the present invention include (meth)acrylic acid, maleic acid, fumaric acid, acetylenedicarboxylic acid, and the like. These compounds are necessary components for securing interfacial adhesion between the adhesive composition and the substrate to be adhered.

Radical Polymerization Initiator

Organic peroxides or compounds being capable of generating free radical by light, electron beam or heat can be used as the radical polymerization initiator in the composition of the present invention, and there are preferably exemplified organic peroxides such as benzoyl peroxide, t-butylperoxy benzoate and dicumyl peroxide, and among organic peroxides, more preferred are hydroperoxides such as cumene hydroperoxide and t-butyl hydroperoxide.

Co-Catalyst

The co-catalyst to be used together with the above-mentioned radical polymerization initiator is an additive which acts on the radical polymerization initiator to generate radical and cure the adhesive of the present invention in a given period of time. Preferred examples thereof include N,N-dimethylaniline, N,N-diethylaniline, N,N-dimethyltoluidine, N,N-diethyltoluidine, triethylamine, triethanolamine, and further reaction products of aldehyde and amine such as butylaldehyde-aniline and butylaldehyde-butylamine, and the like. Reaction products of butylaldehyde-aniline are industrially produced and are available, and examples thereof include NOCCELER8 (registered trademark) (available from OUCHI SHINKO CHEMICAL INDUSTRIAL CO., LTD.), VANAX808 (registered trademark) (available from R.T.

Vanderbilt Company, Inc.), Reilly PDHP (registered trademark) (available from Vertellus Specialties, Inc.), etc.

The amount of co-catalyst is preferably 0.01 to 10 parts by weight based on 100 parts by weight of the vinyl monomer (A).

Curing Accelerator (Promoter)

The curing accelerator to be used together with the above-mentioned radical polymerization initiator is an additive which acts as a catalyst for decomposition reaction of the radical polymerization initiator, and examples thereof include metallic salts of cobalt, iron, copper, tin, lead, etc. such as cobalt naphthenate, iron naphthenate, copper octanoate, iron hexanoate and acetylacetone copper. When the curing accelerator is used, its amount is preferably 0.00001 to 1 part by weight based on 100 parts by weight of the vinyl monomer (A).

Epoxy Resin

It is preferable that the composition of the present invention further comprises an epoxy resin in an amount of 0.1 to 30 parts by weight based on 100 parts by weight of the vinyl monomer (A) for the purposes of absorbing an acid component which can be generated by a reaction of chlorosulfonyl group or securing compatibility between the components constituting the composition of the present invention and also for the purpose of using as a diluent for the acrylic monomer (A). Examples of such an epoxy resin include bisphenol-A; monofunctional or polyfunctional glycidyl ether of bisphenol-F; alicyclic epoxy compound resins such as 3,4-epoxy-cyclohexylmethyl-3,4-epoxycyclohexane carboxylate and 3,4-epoxy-6-methylcyclohexylmethyl-3,4-epoxycyclohex-ane carboxylate; and a combination thereof, and preferred are bisphenol-A type epoxy resins which are commercially available, for example, Epon828 of Hexion Specialty Chemicals, Inc. and DER331 of The Dow Chemical Company. Examples of bisphenol-F type epoxy resins include Epon862 and Epon863 commercially available from Hexion Specialty Chemicals, Inc.

Preferred Embodiment of Adhesive Composition

The adhesive composition of the present invention is preferably formed into a two-component adhesive, in which the components thereof such as the vinyl monomer (A), the fine polymer particles (B), the ethylenically unsaturated carboxylic acid compound, the elastomer being soluble in the vinyl monomer (A) and the radical polymerization initiator are separated into two groups in a proper combination, and when used, the both are mixed at a proper ratio. Thus, the adhesive composition of the present invention can be stored stably for a long period of time.

One of these two liquid components is an activator side component and comprises either of a free radical generating agent being a component of the radical polymerization initiator or a component accelerating the generation of free radical. An organic peroxide is included in the free radical generating agent, but is not contained (added) in the same side as the co-catalyst and the curing accelerator (promoter) which are contained as the components for accelerating the generation of free radical. Another side which is not the activator side is called as an adhesive side or an adhesive component. The vinyl monomer (A) and the fine polymer particles (B) can be contained in either of the activator side or the adhesive side or in both of them. Thus, the adhesive composition of the present invention can be used in such a way that just before use, two components are mixed and the mixture is coated on a substrate to be adhered. Or, the adhesive composition can be used as an adhesive in such a way that one of substrates to be adhered is coated with the activator side component and another substrate is coated with the adhesive side component and the both are stuck together, thereby bringing the two liquids into contact with each other and starting the curing. It is preferable that the adhesive side and the activator side are mixed so that the ratio of adhesive side to activator side is 20:1 to 1:20, further preferably 10:1 to 0.8:1.2.

Hydroperoxide Type Organic Peroxide

While being kept in contact with air, the hydroperoxide type organic peroxide to be used in the present invention has a weak action for polymerizing the anaerobic adhesive composition of the present invention, but has a capability such that after the contact with air is cut off, the hydroperoxide type organic peroxide acts together with the organic sulfimide compound and the amine compound to generate free radical and enables the polymerization to start. Examples of such hydroperoxide type organic peroxide include cumene hydroperoxide, t-butyl hydroperoxide, and the like.

It is preferable to use the hydroperoxide type organic peroxide according to the present invention in an amount of 0.01 to 12 parts by weight, more preferably 0.05 to 5 parts by weight based on 100 parts by weight of the vinyl monomer (A).

Organic Sulfimide Compound and Amine Compound

In the present invention, the organic sulfimide compound and the at least one amine compound selected from the group consisting of N,N-disubstituted arylamines and hydrogenated products of heterocyclic secondary amines are additives which act as a curing accelerator, namely, a catalyst for decomposition reaction of the above-mentioned organic peroxide which is the radical polymerization initiator.

The above-mentioned organic sulfimide compound is preferably contained in the adhesive composition of the present invention within a range from 0.01 to 10 parts by weight, more preferably within a range from 0.05 to 5 parts by weight based on 100 parts by weight of the vinyl monomer (A), and o-benzoic sulfimides are preferred.

The above-mentioned amine compound is preferably contained in the adhesive composition of the present invention within a range from 0.01 to 3 parts by weight based on 100 parts by weight of the vinyl monomer (A), and N,N-dimethyl-p-toluidine is preferred.

Examples of the N,N-disubstituted arylamines include N,N-dimethylaniline, N,N-diethylaniline, N,N-dimethyl-toluidine, and the like, and examples of the hydrogenated products of heterocyclic secondary amines include 1,2,3,4-tetrahydroquinoline, and the like.

Photopolymerization Initiator

The photopolymerization initiator in relation to the photocurable adhesive composition of the present invention can be selected from those undergoing radical polymerization of the vinyl monomer (A) by irradiation of ultraviolet ray, electron beam or visible light.

Examples of the photopolymerization initiator include benzophenones such as benzophenone and 4,4-bis(N,N'-dimethylamino)benzophenone, benzoins such as benzoin and benzoin alkyl ether(alkyl=methyl, ethyl, isopropyl), acetophenones such as 2,2-dimethoxyacetophenone and 1,1-dichloroacetophenone, benzylketals such as benzyldimethylketal (Irgacure651 available from Chiba Specialty Chemicals Co., Ltd.), anthraquinones such as 2-methylanthraquinone, 1-chloroanthraquinone and 2-amylanthraquinone, bisacylphosphine oxides such as phenyldi(2, 4,6-trimethylbenzoyl)phosphine oxide (Irgacure819 available from Chiba Specialty Chemicals Co., Ltd.), benzoylphosphine oxides such as 2,4,6-trimethylbenzoyl-diphenylphosphine oxide, triphenylphosphine, and in addition, -hydroxyphenyl ketones such as 1-hydroxycyclohexyl phenyl ketone (for example, Irgacure 184 available from Chiba Specialty Chemicals Co., Ltd.), 2-hydroxyisopropyl phenyl ketone and 2-hydroxy-1-4-(2-hydroxyethoxy)phenyl-1-propanone, thioxanthones such as thioxanthone and 2-chlorothioxanthone, camphorquinone, and the like. In addition, acridine derivatives, phenazine derivatives and quinoxaline derivatives can be used.

The photopolymerization initiator is not always necessary when curing the composition of the present invention with electron beam, but is necessary in the case of curing it with ultraviolet ray or visible light. A preferred amount of the photopolymerization initiator is from 0.1 to 12 parts by weight based on 100 parts by weight of the vinyl monomer (A). A more preferred amount is from 0.3 to 8 parts by weight as far as the adhesive composition satisfying the requirements of the present invention has good light transmission and does not shield and scatter especially ultraviolet ray and visible light. Also, a plurality of these photopolymerization initiators can be used in combination.

Further, the photopolymerization initiator may comprise a photosensitizer usually used in combination. The photosensitizer is not activated by itself by irradiation of ultraviolet ray or the like, but when using the photoinitiator together, has a function of making the radical polymerization advance easily as compared with a single use of a photoinitiator. Examples of the photosensitizer include amines such as n-butylamine, triethylamine, N-methyldiethanolamine, piperidine, N,N-dimethylaniline, triethylenetetramine and diethylaminoethyl (meth)acrylate, urea based compounds such as o-tolylthiourea, sulfur compounds such as s-benzyl-isothiouronium-p-toluene sulfonate, nitriles such as N,N-dimethyl-p-aminobenzonitrile, phosphorus compounds such as sodium diethylthiophosphate, and the like. The amount of photosensitizer is preferably from 0 to 6 parts by weight.

Curing

The photocurable adhesive composition of the present invention can be cured by properly applying it on articles to be adhered, sticking the articles and then carrying out, for example, irradiation of ultraviolet ray at an accumulated quantity of 1 to 4,000 mJ/cm$^2$ with a high pressure mercury vapor lamp or a metal halide lamp.

(Additives)

At use of the composition of the present invention, thereto can be mixed an organic peroxide, a photopolymerization initiator, a curing accelerator, a chain transfer agent, a photosensitizer, a reducing agent, a plasticizer, a filler, an adhesion imparting agent (including a primer), a dye, a pigment, a stabilizer, a ultraviolet absorber, a diluent (reactive/non-reactive), an organic solvent, and the like.

It is possible to add, according to need, a wax and paraffins to the adhesive composition of the present invention for the purpose of avoiding inhibition of curing due to oxygen at an interface coming into contact with air. Further, it is possible to use the composition by adding thereto a filler, a colorant, an extender, a thixotropy-imparting agent, an organic solvent, water, coupling agents such as a silane coupling agent, an antioxidant, a photoinitiator, a photosensitizer, and the like.

(Applications)

The curable composition of the present invention can be used as a thermosetting composition or a master batch thereof or a thermoplastic resin material for applications such as an adhesive, a resin syrup, a coating material, an overprint varnish, a solder mask, a ultraviolet ray/electron beam curable material, a rapid prototyping material, a casting material, a plastisol, resin concrete and resin mortar, a cast material, an insulating resin, an anaerobic curable resin, a screw thread loosening preventing agent, a bonding paste, a sealing agent, a gasket, a packing and the like.

EXAMPLES

Hereinafter, the present invention is explained in more detail by way of Examples and Comparative Examples, but the present invention is not limited to them.

(Evaluation Method)

First of all, the evaluation method of compositions of each Example and Comparative Example is explained below.

(1) Volume Average Particle Size

The volume average particle size of the fine polymer particles (B) is measured with a particle size measuring device (Microtrac UPA manufactured by Nikkiso Co., Ltd.)

(2) Observation of Dispersion State and Particle Dispersion Ratio

Observation of dispersion state and calculation of particle dispersion ratio of fine polymer particles (B) which are included in the cured articles of the compositions obtained by Examples of the present invention and Comparative Examples using a transmission electron microscope are as follows.

After the cured articles are obtained by the methods described in each Example and Comparative Example, an ultrathin section stained with osmium tetraoxide or ruthenium tetraoxide is prepared. The ultrathin section is observed by a transmission electron microscope and at least two-components of the ultrathin section are photographed in a range of 16 22 μm. In the obtained TEM photograph, four areas of five centimeters square (areas of five μm square) are selected at random, and the total number of rubber-like polymer particles $B_0$ and the number of rubber-like polymer particles $B_1$ in which three or more particles are in contact (if one rubber-like polymer particle contacts with n particles, the number is counted as n) are determined. Then, the particle dispersion ratio is calculated by the following formula 1.

[Mathematical formula 1]

$$\text{Particle dispersion ratio (\%)} = (1 - (B_1/B_0)) 100 \quad \text{(formula 1)}$$

(3) Viscosity of Compositions in Examples

The viscosity is measured with a Bohlin CVOR rheometer manufactured by Malvern Instruments Ltd., with a configuration of cone/plate using a 40 mm diameter cone.

(4) Quantitative Determination of a Trace Amount Active Oxygen Concentration

The quantitative determination of a trace amount active oxygen concentration is carried out by the following procedure.

At first, a sample whose concentration of a trace amount active oxygen is measured is weighed precisely into a Erlenmeyer flask of 125 mL, and 25 mL of the after-described acetic acid-chloroform solvent (2+1) is added, followed by a bubbling under nitrogen for one and a half minute to dissolve the sample. To this mixture is added 1 mL of the after-described potassium iodide solution (50%), followed by further one minute bubbling under nitrogen and mixing. Here, a glass capillary is used for the bubbling in conformity to ASTM D2340-03.

Then, the Erlenmeyer flask is sealed by a glass stopper, with the inside of the Erlenmeyer flask being kept under nitrogen atmosphere and left to stand for an hour in a dark place. During this time, the solution is colored by generated free iodine if active oxygen exists. After being left to stand for an hour, the solution is titrated by a 0.01 N sodium thiosulfate solution under nitrogen atmosphere, and the point where the color of free iodine disappears is defined as an end point. Additionally, reagents other than the sample are also added into an Erlenmeyer flask of 100 mL in the same procedure at the same time, and this mixture is also titrated in the same manner as a blank.

The active oxygen concentration included in the sample is calculated by the following formula 2.

(Mathematical formula 2)

Active oxygen concentration, ppm (mg/kg)=[(A−B)N 8.00 1,000]/w          (formula 2)

In this formula, A, B, N and w are as follows.
A: the amount of the 0.01 N sodium thiosulfate standard solution required for the titration of the sample solution.
B: the amount of the 0.01 N sodium thiosulfate standard solution required for the titration of the blank.
N: normality of the 0.01 N sodium thiosulfate standard solution.
w: the amount of the sample, which is weighed precisely and whose concentration of a trace amount active oxygen is measured.

Furthermore, in order that the amount of (A−B) of the formula 2 does not become too small, when a buret of 10 mL is used, the sample amount w is generally set to be in the range of approximately 2 to 8 g according to the contained amount of the trace amount active oxygen.

As the acetic acid-chloroform solvent (2+1), the mixture of 200 mL of acetic acid and 100 mL of chloroform is prepared at room temperature in the procedure described in ASTM D2340-03 to be used.

Moreover, the potassium iodide solution (50%) is prepared by dissolving 20 g of potassium iodide into 20 mL of distilled water de-aerated at room temperature in the procedure described in ASTM D2340-03. Here, normal distilled water subjected to bubbling with nitrogen for 10 minutes to remove dissolved oxygen is used as de-aerated distilled water.

Further, as the 0.01 N sodium thiosulfate standard solution, the commercial one manufactured by Wako Pure Chemical Industries, Ltd. is used as it is, and the measured value of the manufacturer is used as normality.

(5) Method of Filtering Test

After mixing 10 g of the sample with 10 g of MEK, the mixture is put through a filter having a mesh of 0.45 μm (membrane material: RC "regenerated cellulose") and it is recognized as "Passed" when all of the mixture can be filtered, and it is recognized as "Not Passed" when the filter is clogged and the all amount of the mixture cannot be filtered.

(6) Thermal Stability Test 1

Under air atmosphere, 100 g of the sample in a glass bottle is left to stand for two hours at 95 C.

(7) Thermal Stability Test 2

Into a glass bottle having an internal volume of 140 mL is put 100 g of the sample, and after nitrogen substitute of the gas phase part of the glass bottle and sealing, the glass bottle is left to stand at 110 C. The variation per hour of the viscosity is observed by taking the glass bottle and declining it.

(8) Lap-Shear Strength

According to the method described in JIS-K6850, two steel plates of 25 100 mm having the thickness of 1.6 mm are used and the surface of one plate is coated in the range of 25 mm width 12.5 mm to form an adhesive surface. After preparing the test piece by gluing the both plates together with the thickness of 100 μm adhesive layer, the sample is left for 48 hours or more at room temperature. The adhesive strength of the cured sample is measured, with defining a deformation speed at a test as 1 mm/min.

(Preparation of Fine Polymer Particles)

The fine polymer particles B1 to B4, B3X and BC1 to BC2 which are used in each Example and Comparative Example are prepared in the methods described below.

[Preparation of Diene Rubber Fine Polymer Particles (B1)]

Into a pressure polymerizing machine of 100 L were added 200 parts by weight of water, 0.03 part by weight of tripotassium phosphate, 0.25 part by weight of potassium dihydrogenphosphate, 0.002 part by weight of ethylenediaminetetraacetic acid, 0.001 part by weight of ferrous sulfate and 1.5 parts by weight of sodium dodecylbenzenesulfonate. After carrying out a substitution with nitrogen enough to remove oxygen while stirring, 77 parts by weight of butadiene and 23 parts by weight of styrene (100 parts by weight) were added and the mixture was heated to 45 C. While keeping the temperature, 0.015 part by weight of paramenthane hydroperoxide, and subsequently 0.04 part by weight of sodium formaldehyde sulfoxylate were added and the polymerization was started. Four hours after the start of the polymerization, 0.01 part by weight of paramenthane hydroperoxide, 0.0015 part by weight of ethylenediaminetetraacetic acid and 0.001 part by weight of ferrous sulfate were added. Ten hours after starting of the polymerization, the remaining monomer was removed under reduced pressure by evaporating to finish the polymerization. The polymerization conversion rate was 98%. In this manner, the aqueous latex of the rubber-like polymer (SBR) composed of a styrene-butadiene copolymer to be a core polymer, was obtained.

Next, to a glass container of 3 L was charged 1,300 g of the aqueous latex of the rubber-like polymer (containing 420 g of styrene-butadiene copolymer as rubber particles being solid contents) and 440 g of purified water was added, followed by heating to 60 C while carrying out nitrogen substitution and stirring. To this aqueous latex was added a mixture composed of a monomer mixture (86.9 g) of 20.2 g of glycidyl methacrylate (GMA), 15.2 g of acrylonitrile (AN), 50.6 g of styrene (St) and 0.9 g of allyl methacrylate (AlMA) and 0.3 g of t-butyl hydroperoxide over 120 minutes, followed by a graft polymerization. After finishing the addition of the above-described mixture and then continuing stirring for further two hours, the reaction was terminated to obtain the aqueous latex containing fine polymer particles (B1) (506.9 g). The polymerization conversion rate was 99%. A part of the fine polymer particles (B1) in the aqueous latex state was diluted by water, and the volume average particle size was measured by a particle size measuring device (Microtrac UPA manufactured by Nikkiso Co., Ltd.). The volume average particle size was 0.1 μm and the particle size distribution was a sharp monodispersion.

[Preparation of Acrylic Fine Polymer Particles (B2)]

Under nitrogen atmosphere, into a glass reaction container of 2 L were charged 650 g of water, 0.5 g of sodium dodecylbenzenesulfonate, 0.5 g of sodium sulfate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate. After the temperature was elevated to 60 C, the mixture of 400 g of butyl acrylate (BA), 16 g of allyl methacrylate (AlMA) and 0.5 g of cumene hydroperoxide was added over 350 minutes, followed by stirring for 90 minutes. During this, sodium dodecylbenzenesulfonate (total: 2 g) was added in twice. In this manner, the aqueous latex of the rubber-like copolymer (416 g), being a polymerized product of a monomer mixture mainly comprising butyl acrylate, was obtained.

Next, into the aqueous latex of the above core polymer were added a mixture composed of a monomer mixture (103.5 g) of 25 g of 2-methoxyethyl acrylate, 30 g of butyl acrylate, 45 g of ethyl acrylate and 3.5 g of allyl methacrylate as a crosslinking agent and 0.2 g of t-butyl hydroperoxide over 120 minutes, followed by a graft polymerization. After finishing the addition of the above-described mixture and then continuing stirring for further two hours, the reaction was terminated to obtain the aqueous latex containing fine polymer particles (B2). The polymerization conversion rate was 99%. A part of the fine polymer particles (B2) (519.5 g) in the aqueous latex state was diluted by water, and the volume average particle size was measured by a particle size measuring device (Microtrac UPA manufactured by Nikkiso Co., Ltd.). The volume average particle size was 0.2 µm and the particle size distribution was a sharp monodispersion.

[Preparation of Diene Rubber Fine Polymer Particles (B3)]

To a glass container of 3 L was charged 1,300 g of the above-described aqueous latex of the rubber-like polymer composed of the styrene-butadiene copolymer (containing 420 g of styrene-butadiene copolymer as rubber particles being solid contents), and 440 g of purified water was added, followed by heating to 60 C while carrying out nitrogen substitution and stirring. To this aqueous latex of the core polymer mainly comprising styrene-butadiene rubber was added a mixture composed of a monomer mixture (86 g) of 10.1 g of 4-hydroxybutyl acrylate (4-HBA), 15.2 g of butyl acrylate (BA) and 60.7 g of styrene (St) and 0.4 g of t-butyl hydro peroxide over 120 minutes, followed by a graft polymerization. After finishing the addition of the above-described mixture, two hour stirring was further continued and the reaction was terminated to obtain the aqueous latex containing fine polymer particles (B3). The polymerization conversion rate was 99%. A part of the fine polymer particles (B3) (506.4 g) in the aqueous latex state was diluted by water, and the volume average particle size was measured by a particle diameter measuring device (Microtrac UPA manufactured by Nikkiso Co., Ltd.). The volume average particle size was 0.1 µm and the dispersion of the particle diameter was a sharp monodispersion.

[Preparation of diene Rubber Fine Polymer Particles (B4)]

To a glass container of 3 L was charged 1,300 g of the above-described aqueous latex of the rubber-like polymer composed of the styrene-butadiene copolymer (containing 420 g of styrene-butadiene copolymer as rubber particles being solid contents) and 440 g of purified water was added, followed by heating to 60 C while carrying out nitrogen substitution and stirring. To this aqueous latex of the core polymer mainly comprising styrene-butadiene rubber was added a mixture composed of a monomer mixture (87.3 g) of 20.2 g of 2-methoxyethyl acrylate (2-MEA), 5.1 g of acrylonitrile (AN), 60.7 g of butyl acrylate (BA) and 1.3 g of allyl methacrylate (AlMA) as a crosslinking agent and 0.4 g of t-butyl hydro peroxide as a polymerization initiator over 120 minutes, followed by a graft polymerization. After finishing the addition of the above-described mixture and continuing stirring for further two hours, the reaction was terminated to obtain the aqueous latex containing fine polymer particles (B4) (507.3 g). The polymerization conversion rate was 99%. The volume average particle size of the fine polymer particles (B4) in the aqueous latex state was measured in the same method as described above. The volume average particle size was 0.1 µm and the particle size distribution was a sharp monodispersion.

[Preparation of Diene Rubber Fine Polymer Particles (BC1) used in Comparative Example]

Into a pressure polymerizing machine of 100 L were added 200 parts by weight of water, 0.03 part by weight of tripotassium phosphate, 0.25 part by weight of potassium dihydrogenphosphate, 0.002 part by weight of ethylenediaminetetraacetic acid, 0.001 part by weight of ferrous sulfate and 1.5 parts by weight of sodium dodecylbenzenesulfonate. After carrying out a substitution with nitrogen enough to remove oxygen while stirring, 75 parts by weight of butadiene and 25 parts by weight of styrene (100 parts by weight) were added and the mixture was heated to 45 C. While keeping the temperature, 0.015 part by weight of paramenthane hydroperoxide, and subsequently 0.04 part by weight of sodium formaldehyde sulfoxylate were added and the polymerization was started. Four hours after the start of the polymerization, 0.01 part by weight of paramenthane hydroperoxide, 0.0015 part by weight of ethylenediaminetetraacetic acid and 0.001 part by weight of ferrous sulfate were added. Ten hours after starting of the polymerization, the remaining monomer was removed under reduced pressure by evaporating to finish the polymerization. The polymerization conversion rate was 98%. In this manner, the aqueous latex of the rubber-like polymer (SBR) comprising the styrene-butadiene copolymer to be a core polymer, was obtained.

Next, to a glass container of 3 L was charged 1,176 g of the above aqueous latex of the rubber-like polymer (containing 380 g of styrene-butadiene copolymer as rubber particles being solid contents), and 440 g of purified water was added, followed by heating to 60 C while carrying out nitrogen substitution and stirring. To this aqueous latex was added a mixture composed of a monomer mixture (126.6 g) of 116.5 g of methyl methacrylate (MMA) and 10.1 g of ethyl acrylate (EA) and 0.3 g of t-butyl hydroperoxide over 120 minutes, followed by a graft polymerization. After finishing the addition of the above-described mixture and continuing stirring for further two hours, the reaction was terminated to obtain the aqueous latex containing fine polymer particles (BC1) (506.6 g) for Comparative Example. The polymerization conversion rate was 99%. A part of the fine polymer particles (BC1) in the aqueous latex state was diluted by water, and the volume average particle size was measured by a particle size measuring device (Microtrac UPA manufactured by Nikkiso Co., Ltd.). The volume average particle size was 0.1 µm and the particle size distribution was a sharp monodispersion.

[Preparation of Acrylic Rubber Fine Polymer Particles (BC2) Used in Comparative Examples]

Under nitrogen atmosphere, into a glass reaction container of 2 L were charged 650 g of water, 0.5 g of sodium dodecylbenzenesulfonate, 0.5 g of sodium sulfate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate. After the temperature was elevated to 60 C, a mixture of 375 g of butyl acrylate (BA), 3.8 g of allyl methacrylate (AlMA) and 0.4 g of cumene hydroperoxide was added over 350 minutes, followed by stirring for 90 minutes. During this, sodium dodecylbenzenesulfonate (total: 2 g) was added in twice. In this manner, the aqueous latex of the rubber-like copolymer (378.8 g), being a polymerized product of a monomer mixture mainly comprising butyl acrylate, was obtained.

Next, into the above aqueous latex of the core polymer was added a mixture composed of a monomer mixture (126.3 g) of 70 g of methyl methacrylate (MMA), 50 g of styrene (St), 5 g of butyl acrylate (BA) and 1.3 g of allyl methacrylate (AlMA) and 0.2 g of t-butyl hydroperoxide over 120 minutes, followed by a graft polymerization. After finishing the addition of the above-described mixture and continuing stirring for further two hours, the reaction was terminated to obtain the aqueous latex containing fine polymer particles (BC2). The polymerization conversion rate was 99%. A part of the fine polymer particles (BC2) (505.1 g) in the aqueous latex state was diluted by water, and the volume average particle size was measured by a particle size diameter measuring device (Microtrac UPA manufactured by Nikkiso Co., Ltd.). The volume average particle size was 0.2 μm and the particle size distribution was a sharp monodispersion.

Each composition of the above fine polymer particles B1 to B4 and BC1 to BC2 is shown in Table 1.

TABLE 1

| Fine polymer particles | Core Composition | Parts | Shell Composition | Parts | Total parts |
|---|---|---|---|---|---|
| B1 | SBR | 82.8 | GMA/AN/St/AlMA | 4/3/10/0.2 | 100 |
| B2 | BA/AlMA | 77/3 | 2-MEA/BA/EA/AlMA | 4.8/5.8/8.7/0.7 | 100 |
| B3 | SBR | 83 | 4-HBA/BA/St | 2/3/12 | 100 |
| B4 | SBR | 82.8 | 2-MEA/AN/BA/AlMA | 4/1/12/0.2 | 100 |
| BC1 | SBR | 75 | MMA/EA | 23/2 | 100 |
| BC2 | BA/AlMA | 74.2/0.8 | MMA/St/BA/AlMA | 13.9/9.9/1.0/0.2 | 100 |

[Preparation of Acrylic Rubber Fine Polymer Particles (B3X)]

Under nitrogen atmosphere, into a glass reaction container of 2 L were charged 650 g of water, 0.5 g of sodium dodecylbenzenesulfonate, 0.5 g of sodium sulfate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate. After the temperature was elevated to 60 C, a mixture of 375 g of butyl acrylate (BA), 3.8 g of allyl methacrylate (AlMA) and 0.4 g of cumene hydroperoxide was added over 350 minutes, followed by stirring for 90 minutes. During this, sodium dodecylbenzenesulfonate (total: 2 g) was added in twice. In this manner, the aqueous latex of the rubber-like copolymer (378.8 g), being a polymerized product of a monomer mixture mainly comprising butyl acrylate, was obtained.

Next, into the above aqueous latex of the core polymer was added a mixture composed of a monomer mixture (126.3 g) of 70 g of methyl methacrylate (MMA), 50 g of styrene (St), 5 g of butyl acrylate (BA) and 1.3 g of allyl methacrylate (AlMA) and 0.2 g of t-butyl hydroperoxide over 120 minutes, followed by a graft polymerization. After finishing the addition of the above-described mixture and continuing stirring for further two hours, the reaction was terminated to obtain the aqueous latex containing fine polymer particles of Comparative Example (B3X). The polymerization conversion rate was 99%. A part of the fine polymer particles (B3X) (505.1 g) in the aqueous latex state was diluted by water, and the volume average particle size was measured by a particle size measuring device (Microtrac UPA manufactured by Nikkiso Co., Ltd.). The volume average particle size was 0.2 μm and the particle size distribution was a sharp monodispersion.

The overview of each composition of the above fine polymer particles B2 and B3X is shown in Table 2.

TABLE 2

| Fine polymer particles | Core Composition | Parts | Shell Composition | Parts | Total parts |
|---|---|---|---|---|---|
| B2 | BA/AlMA | 77/3 | 2-MEA/BA/EA/AlMA | 4.8/5.8/8.7/0.7 | 100 |
| B3X | BA/AlMA | 74.2/0.8 | MMA/St/BA/AlMA | 13.8/9.9/1/0.3 | 100 |

The followings are experimental results regarding the whole cured composition of the present invention.

Example 1

(Meth)Acrylic Monomer Composition Containing Fine Polymer Particles (B1)

To 1,000 g of an aqueous latex containing the fine polymer particles (B1) was added 1,000 g of methyl acetate. After stirring, 700 g of water was further added to reprecipitate the fine polymer particles (B). After separating the liquid phase from the reprecipitated product, 1,300 g of methyl acetate was added to the reprecipitated product, followed by stirring for 90 minutes at room temperature. After further mixing 1,580 g of cyclohexyl methacrylate (CHMA) as a vinyl monomer (A), methyl acetate was distilled off under reduced pressure to obtain the composition of the present invention (1,859 g) in which 17.6 parts by weight of graft-polymerized particles being the fine polymer particles (B) were dispersed in 100 parts by weight of cyclohexyl methacrylate, i.e. 15 wt % fine polymer particles (B) were dispersed.

This composition was diluted with methyl ethyl ketone, and the volume average particle size of fine polymer particles (B) was measured by a particle size measuring device (Microtrac UPA manufactured by Nikkiso Co., Ltd.). The volume average particle size was 0.1 μm and the particle size distribution was a sharp monodispersion like (B) in the aqueous latex state.

After taking 10 g of the composition and diluting with 10 g of methyl ethyl ketone to make a solution of 20 g in total, the mixture was put through a filter having a mesh of 0.45 μm (membrane material: RC "regenerated cellulose") to carry out a filter evaluation, and all of the solution of 20 g was able to be filtered.

Further, a mixture composed of 33.3 g of the composition, 56.7 g of cyclohexyl acrylate and 10 g of trimethylol propane triacrylate (TMPTA) was prepared, and 0.2 g of Co-NAP (cobalt naphthenate solution manufactured by Wako Pure Chemical Industries, Ltd., cobalt concentration: 6%) and 0.05 g of N,N-dimethylaniline were added to the mixture. After mixing well, 1.25 g of Permek N (manufactured by NOF Corporation) was further mixed well and then the mixture was poured into a glass form applied with a mold release agent, followed by curing for 24 hours at room temperature, subsequently for an hour at 50 C. An ultrathin section was prepared from the obtained cured article, a TEM (transmission electron microscope) photograph (scale: magnification of ×10,000) thereof was photographed and the particle dispersion ratio was evaluated according to the above-described procedure. As a result of the evaluation, it was confirmed that the particle dispersion ratio was higher than 95% and that particles were dispersed in primary particle form.

From the fact that the fine polymer particles (B) are dispersed in primary particle form in the cured object obtained by curing the composition of the present invention, it can be considered that fine polymer particles (B) are dispersed in primary particle form also in the composition of the present invention.

Example 2

(Meth)Acrylic Monomer Composition Containing Fine Polymer Particles (B2)

To 300 g of an aqueous latex containing the fine polymer particles (B2) was added 300 g of methyl acetate. After stirring, water was further added to reprecipitate the fine polymer particles (B). After separating the liquid phase from the reprecipitated product, 500 g of methyl acetate was added to the reprecipitated product, followed by stirring for 90 minutes at room temperature. After further mixing 200 g of isobornyl acrylate (IBOA) as a vinyl monomer (A), methyl acetate was distilled off under reduced pressure to obtain the composition of the present invention (300 g) in which 42.9 parts by weight of graft-polymerized particles being the fine polymer particles (B) were dispersed in 100 parts by weight of isobornyl acrylate, i.e. 30 wt % fine polymer particles (B2) were dispersed.

This composition was diluted with methyl ethyl ketone, and the volume average particle size of the fine polymer particles (B2) was measured in the same manner as in Example 1. The volume average particle size was 0.2 μm and the particle size distribution was a sharp monodispersion like (B) in the aqueous latex state.

Further, when the filter evaluation was carried out in the same manner as in Example 1, all of the solution of 20 g was able to be filtered.

Moreover, the viscosity of this composition was 1.6 Pa s at 25 C and the dispersion state of the fine polymer particles (B2) did not change even after having been left in a light-shielded cool dark place for three months.

Examples 3 to 5, 7 and 8

(Meth)Acrylic Monomer Composition Containing Fine Polymer Particles (B2)

Examples 3 to 5, 7 and 8 were carried out in the same manner as in Example 2, except that tetrahydrofurfuryl acrylate (THFA) of 480 g was used in Example 3, hydroxyethyl methacrylate (HEMA) of 255 g was used in Example 4, 1,6-hexanediol diacrylate (HDODA) of 480 g was used in Example 5, trimethylolpropane triacrylate (TMPTA) of 522 g was used in Example 7 and ditrimethylolpropane tetraacrylate (DTMPTA) of 522 g was used in Example 8, instead of 200 g of isobornyl acrylate (IBOA) as a vinyl monomer (A) used in Example 2. In Example 3, the composition of the present invention (565 g) in which 17.7 parts by weight of graft-polymerized particles being the fine polymer particles (B) were dispersed in 100 parts by weight of tetrahydrofurfuryl acrylate (THFA), i.e. 15 wt % fine polymer particles (B2) were dispersed was obtained. In Example 4, the composition of the present invention in which 33.3 parts by weight of graft-polymerized particles being the fine polymer particles (B) were dispersed in 100 parts by weight of hydroxyethyl methacrylate (HEMA), i.e. 25 wt % fine polymer particles (B2) were dispersed was obtained. In Example 5, the composition of the present invention (565 g) in which 17.7 parts by weight of graft-polymerized particles being the fine polymer particles (B) were dispersed in 100 parts by weight of 1,6-hexanediol diacrylate, i.e. 15 wt % fine polymer particles (B2) were dispersed was obtained. In Example 7, the composition of the present invention (607 g) in which 16.3 parts by weight of graft-polymerized particles being the fine polymer particles (B) were dispersed in 100 parts by weight of trimethylolpropane triacrylate, i.e. 14 wt % fine polymer particles (B) were dispersed was obtained. In Example 8, the composition of the present invention (607 g) in which 16.3 parts by weight of graft-polymerized particles being the fine polymer particles (B) were dispersed in 100 parts by weight of ditrimethylolpropane tetraacrylate, i.e. 14 wt % fine polymer particles (B2) were dispersed was obtained.

These compositions were diluted with methyl ethyl ketone, and the volume average particle size of the fine polymer particles (B2) was measured in the same manner as in Example 2. The volume average particle size was 0.2 μm, and the particle size distribution was a sharp monodispersion like (B) in the aqueous latex state.

Further, when the filter evaluation was carried out regarding these compositions in the same manner as in Example 2, all of the solution of 20 g was able to be filtered.

Moreover, the viscosity of the composition of Example 7 was 0.4 Pa s at 25 C and the viscosity of the composition of Example 8 was 1.4 Pas at 25 C.

Examples 6 and 9

(Meth)Acrylic Monomer Composition Containing Fine Polymer Particles (B3)

Examples 6 and 9 were carried out in the same manner as in Example 2, except that Example 6 used 300 g of aqueous latex containing fine polymer particles (B3) and Example 9 used 300 g of aqueous latex containing fine polymer particles (B4) instead of 300 g of aqueous latex containing fine polymer particles (B2) used in Example 2, and Example 6 used 480 g of triethylene glycol diacrylate (TEGDA) and Example 9 used 480 g of cyclohexyl acrylate (CHA) instead of 200 g of isobornyl acrylate (IBOA) as a vinyl monomer (A) used in Example 2. In Example 6, the composition of the present invention in which 17.7 parts by weight of graft-polymerized particles being the fine polymer particles (B) were dispersed in 100 parts by weight of triethylene glycol diacrylate, i.e. 15 wt % fine polymer particles (B3) were dispersed was obtained. In Example 9, the composition of the present invention in which 17.7 parts by weight of graft-polymerized particles being the fine polymer particles (B) were dispersed in 100 parts by weight of cyclohexyl acrylate (CHA), i.e. 15 wt % fine polymer particles (B4) were dispersed was obtained.

These compositions were diluted with methyl ethyl ketone, and each volume average particle size of fine polymer particles (B3) of Example 6 and fine polymer particles (B4) of Example 9 was measured in the same manner as in Example 2. The both volume average particle sizes were 0.1 μm, and the particle size distribution was a sharp monodispersion like (B) in the aqueous latex state.

Further, when the filter evaluation was carried out regarding these compositions in the same manner as in Example 2, all of the solution of 20 g was able to be filtered.

Example 10

Using the compositions obtained in Examples 2 to 5 and 7, the following mixture was prepared. That is, the mixture of 100 g (content of fine polymer particles: 5 g) in total, composed of the composition of 7.7 g of Example 2, isobornyl acrylate of 56.35 g, the composition of 5 g of Example 3, tetrahydrofurfuryl acrylate of 0.5 g, the composition of 2 g of Example 4, hydroxyethyl methacrylate of 8 g, the composition of 5 g of Example 5, 1,6-hexanediol diacrylate of 5.25 g, the composition of 5 g of Example 7 and trimethylolpropane triacrylate of 5.2 g was prepared.

After mixing 0.1 g of N,N-dimethylaniline to this mixture, a paste-like mixture of 1 g of benzoyl peroxide and 5 g of styrene monomer was added and mixed quickly, and then the mixture was poured into a glass form applied with a mold release agent, followed by curing for 24 hours at room temperature, subsequently for two hours at 60 C. A TEM observation of this cured article was carried out in the same manner as in Example 1. As a result of evaluating the particle dispersion ratio, the particle dispersion ratio exceeded 90%.

Comparative Example 1

An aqueous solution of calcium chloride (3 wt %) was added to the fine polymer particles (BC1) in the aqueous latex state to solidify them. The mixture was dried for three days at room temperature after dehydrating. The obtained 80 g of powdered fine polymer particles (BC1) was added to 920 g of methyl methacrylate (MMA) being the component (A), followed by mixing with a homo mixer for two hours and dispersing to obtain the composition of Comparative Example 1. During this, since the high temperature mixture may cause a polymerization of methyl methacrylate, the mixture was dispersed while being cooled as needed.

After diluting 10 g of the composition of Comparative Example 1 obtained in the above manner with 10 g of methyl ethyl ketone to make a mixture of 20 g in total, the mixture was put through a filter having a mesh of 0.45 µm and a diameter of 25 mm (membrane material: RC "regenerated cellulose"). Due to the generation of clogging, over half of 20 g of the solution was not able to be filtered. Though the filter was changed to the one having a mesh of 0.45 µm and a diameter of 25 mm whose membrane material was PTFE [Teflon (registered trademark)] to attempt the filtering, the result was similarly that the filtering was not possible. When measuring the volume average particle size in the same manner as in Example 1, the volume average particle size was 3 µm and the particle size distribution varied widely. The particle size distribution was clearly different from that of the fine polymer particles in the aqueous latex state.

Comparative Example 2

An aqueous solution of calcium chloride (3 wt %) was added to the fine polymer particles (BC2) in the aqueous latex state to solidify them. The mixture was dried under reduced pressure for three days at room temperature after dehydrating. To the obtained 100 g of powdered fine polymer particles (BC2) was added 300 g of methyl methacrylate being the component (A). Though the mixing with a homo mixer was attempted, the mixture became a heterogeneous mixture in a semi-solid state, and it was impossible to process with a homo mixer. Therefore, 900 g of methyl methacrylate (MMA) being the component (A) was added to 100 g of (BC2) again, and mixed and dispersed for two hours to obtain the composition of Comparative Example 2. During this, since the high temperature mixture may cause a polymerization of methyl methacrylate, the mixture was dispersed while being cooled as needed.

After diluting 10 g of the composition of Comparative Example 2 obtained in the above manner with 10 g of methyl ethyl ketone to make a mixture of 20 g in total, the mixture was put through a filter having a mesh of 1 µm and a diameter of 25 mm (membrane material: RC "regenerated cellulose"). Due to the generation of clogging, over half of 20 g of the solution was not able to be filtered. Further, 40 g of the composition of Comparative Example 2 was diluted with 25 g of methyl methacrylate and 5 g of trimethylolpropane triacrylate to prepare a mixture. After adding 0.06 g of N,N-dimethylaniline to the mixture and mixing well, a mixture composed of 0.8 g of benzoyl peroxide and 10 g of methyl methacrylate was further added and mixed well, followed by pouring into a glass form for curing. After obtaining a photograph of this cured object by a TEM observation in the same manner as in Example 1, the particle dispersion ratio was evaluated. The particle dispersion ratio was less than 20%.

Comparative Example 3

After adding the aqueous latex (300 g) containing fine polymer particles (BC2) to 300 g of methyl acetate while stirring, water was further added to reprecipitate the fine polymer particles. Though the reprecipitated product was able to be separated from liquid phase, the separated liquid phase was strongly clouded and it was suggested that a part of the polymer remained in the liquid phase without being reprecipitated. To this reprecipitated product was added 350 g of methyl acetate, followed by stirring for one and a half hour at room temperature. After further mixing 740 g of methyl methacrylate (MMA) as a vinyl monomer, methyl acetate was distilled off under reduced pressure to obtain the composition of Comparative Example (783 g) in which 11.5 parts by weight, i.e. 10 wt % fine polymer particles (BC2) were dispersed in 100 parts by weight of methyl methacrylate.

After diluting 10 g of this composition with 10 g of methyl acetate to make a solution of 20 g in total, the mixture was put through a filter having a mesh of 0.45 µm (membrane material: PTFE [Teflon (registered trademark)] to carry out a filter evaluation, but over half of 20 g of the solution was not able to be filtered due to the generation of clogging.

Comparative Example 4

To 900 g of cyclohexyl methacrylate (CHMA) was added 100 g of powdered fine polymer particles (BC2) obtained in the same manner as in Comparative Example 2, followed by mixing with a homo mixer for two hours and dispersing to obtain the composition of Comparative Example 4. During this, since the high temperature mixture may cause a polymerization of cyclohexyl methacrylate, the mixture was dispersed while being cooled as needed.

After diluting 10 g of the composition of Comparative Example 4 obtained in the above manner with 10 g of methyl ethyl ketone to obtain a mixture of 20 g in total, the mixture was put through a filter having a mesh of 0.45 µm (membrane material: RC "regenerated cellulose"). Due to the generation of clogging, over half of 20 g of the solution was not able to be filtered.

Comparative Example 5

To 900 g of hydroxyethyl methacrylate (HEMA) was added 100 g of powdered fine polymer particles (BC1) obtained in the same manner as in Comparative Example 1, followed by mixing with a homo mixer for two hours and dispersing to obtain the composition of Comparative Example 5. During this, since the high temperature mixture may cause a polymerization of cyclohexyl methacrylate, the mixture was dispersed while being cooled as needed.

After diluting 10 g of the composition of Comparative Example 5 obtained in the above manner with 10 g of methyl ethyl ketone to obtain a mixture of 20 g in total, the mixture was put through a filter having a mesh of 0.45 µm and a diameter of 25 mm (membrane material: RC "regenerated cellulose"). Due to the generation of clogging, over half of 20 g of the solution was not able to be filtered.

Comparative Example 6

To 920 g of trimethylolpropane triacrylate (TMPTA) was added 80 g of powdered fine polymer particles (BC1)

obtained in the same manner as in Comparative Example 1, and the composition of Comparative Example 6 was attempted to be obtained by mixing and dispersing by a homo mixer. The mixture was attempted to be dispersed while being cooled as needed to avoid polymerization, but the mixture increased in viscosity. Since it was assumed that an undesirable polymerization (spontaneous polymerization) was caused, the mixing was stopped.

Comparative Example 7

To 920 g of 1,6-hexanediol diacrylate (HDODA) was added 80 g of powdered fine polymer particles (BC1) obtained in the same manner as in Comparative Example 1, and the composition of Comparative Example 7 was attempted to be obtained by mixing and dispersing by a homo mixer. The mixture was attempted to be dispersed while being cooled as needed to avoid polymerization, but the mixture increased in viscosity. Since it was assumed that an undesirable polymerization (spontaneous polymerization) was caused, the mixing was stopped. After diluting 10 g of this mixture with 10 g of methyl ethyl ketone to obtain the mixture of 20 g, the mixture was put through a filter having a mesh of 0.45 µm and a diameter of 25 mm (membrane material: RC "regenerated cellulose"). Due to the generation of clogging, over half of 20 g of the solution was not able to be filtered.

In Table 3, each composition and experimental results of the above Examples 1 to 9 and Comparative Examples 1 to 7 are shown.

methyl acetate under reduced pressure (during the operation of distilling off, nitrogen-oxygen mixed gas including 7 vol % oxygen was introduced into the system as needed) to obtain the composition (1,859 g) in which 17.6 parts by weight of graft-polymerized particles being the fine polymer particles (B) were dispersed in 100 parts by weight of cyclohexyl methacrylate, i.e. 15 wt % fine polymer particles (B) were dispersed.

The active oxygen concentration of the obtained composition was 18 ppm, and the result of the filtering test was evaluated as passed. This composition was diluted by methyl ethyl ketone, and the volume average particle size of fine polymer particles (B) was measured again by a particle size measuring device (Microtrac UPA manufactured by Nikkiso Co., Ltd.). The volume average particle size was 0.1 µm and the particle size distribution was a sharp monodispersion like (B) in the aqueous latex state.

Further, a mixture composed of 33.3 g of the composition, 56.7 g of cyclohexyl acrylate and 10 g of trimethylolpropane triacrylate (TMPTA) was prepared, and 0.2 g of Co-NAP (cobalt naphthenate solution manufactured by Wako Pure Chemical Industries, Ltd., cobalt concentration: 6%) and 0.05 g of N,N-dimethylaniline were added to the mixture. After mixing well, 1.25 g of Permek N (manufactured by NOF Corporation) was further mixed well and then the mixture was poured into a glass form applied with a mold release agent, followed by curing for 24 hours at room temperature, subsequently for an hour at 50 C. An ultrathin section was

TABLE 3

| | | Component (B) | | 0.45 µm filter | |
| | Component (A) | Core/Shell | Wt % | evaluation | Remarks |
| --- | --- | --- | --- | --- | --- |
| Ex. 1 | CHMA | B1 | 15 | Passed | Particle dispersion ratio of the cured article: not less than 95% |
| Ex. 2 | IBOA | B2 | 30 | Passed | Viscosity: 1.6 Pa s |
| Ex. 3 | THFA | B2 | 15 | Passed | |
| Ex. 4 | HEMA | B2 | 25 | Passed | |
| Ex. 5 | HDODA | B2 | 15 | Passed | |
| Ex. 6 | TEGDA | B3 | 15 | Passed | |
| Ex. 7 | TMPTA | B2 | 14 | Passed | Viscosity: 0.4 Pa s |
| Ex. 8 | DTMPTA | B2 | 14 | Passed | Viscosity: 1.4 Pa s |
| Ex. 9 | CHA | B4 | 15 | Passed | |
| Com. Ex. 1 | MMA | BC1 | 10 | Not Passed | |
| Com. Ex. 2 | MMA | BC2 | 10 | Not Passed | Particle dispersion ratio of the cured article: less than 20% |
| Com. Ex. 3 | MMA | BC2 | 10 | Not Passed | |
| Com. Ex. 4 | CHMA | BC2 | 10 | Not Passed | |
| Com. Ex. 5 | HEMA | BC1 | 10 | Not Passed | |
| Com. Ex. 6 | TMPTA | BC1 | 8 | | Increased in viscosity and polymerized during the mixing |
| Com. Ex. 7 | HDODA | BC1 | 8 | Not Passed | Increased in viscosity and polymerized during the mixing |

Example 11

To 1,000 g of an aqueous latex containing fine polymer particles (B1) was added 1,000 g of methyl acetate. After stirring, 700 g of water was further added to reprecipitate the fine polymer particles (B). After separating the liquid phase from the reprecipitated product, 1,300 g of methyl acetate was added to the reprecipitated product, followed by stirring for 90 minutes at room temperature. After further mixing 1,580 g of cyclohexyl acrylate (CHA) as a vinyl monomer (A), under nitrogen-oxygen mixed gas atmosphere including 7 vol % oxygen, the pressure was gradually reduced to 280 mmHg from 400 mHg with distilling off the volatile portions, and the mixture was heated with hot water of 48 to 53 C to distill off prepared from the obtained cured article, a TEM (transmission electron microscope) photograph (scale: magnification of ×10,000) thereof was photographed and the particle dispersion ratio was evaluated according to the above-described procedure. As a result of the evaluation, it was confirmed that the particle dispersion ratio was higher than 95% and that particles were dispersed in primary particle form.

From the fact that the fine polymer particles (B) are dispersed in primary particle form in the cured object obtained by curing the composition of the present invention, it can be considered that fine polymer particles (B) are dispersed in primary particle form also in the composition of the present invention.

Example 12

To 300 g of an aqueous latex containing fine polymer particles (B2) was added 300 g of methyl acetate. After stirring, 210 g of water was further added to reprecipitate the fine polymer particles (B). After separating the liquid phase from the reprecipitated product, 1,300 g of methyl acetate was added to the reprecipitated product, followed by stirring for 90 minutes at room temperature. After further mixing 378 g of cyclohexyl acrylate (CHA) as a vinyl monomer (A), under nitrogen-oxygen mixed gas atmosphere including 6 vol % oxygen, the pressure was gradually reduced to 280 mmHg from 400 mHg with distilling off the volatile portions, and the mixture was heated with hot water of 42 to 48 C to distill off methyl acetate under reduced pressure (during the operation of distilling off, the above nitrogen-oxygen mixed gas was introduced into the system as needed) to obtain the composition of the present invention (461 g) in which 22 parts by weight of graft-polymerized particles being the fine polymer particles (B) were dispersed in 100 parts by weight of cyclohexyl acrylate, i.e. 18 wt % fine polymer particles (B) were dispersed.

The active oxygen concentration of the obtained composition was 5 ppm, and the result of the filtering test was evaluated as passed. Further, this composition was diluted by methyl ethyl ketone, and the volume average particle size of fine polymer particles (B) was measured again by a particle size measuring device (Microtrac UPA manufactured by Nikkiso Co., Ltd.). The volume average particle size was 0.1 μm and the particle size distribution was a sharp monodispersion like (B) in the aqueous latex state.

Example 13

To 300 g of an aqueous latex containing fine polymer particles (B2) was added 300 g of methylal. After stirring, 150 g of water was further added to reprecipitate the fine polymer particles (B). After separating the liquid phase from the reprecipitated product, 500 g of methylal was added to the reprecipitated product, followed by stirring for 90 minutes at room temperature. After further mixing 200 g of isobornyl acrylate (IBOA) as a vinyl monomer (A), under nitrogen-oxygen mixed gas atmosphere including 5 vol % oxygen, the pressure was gradually reduced to 320 mmHg from 450 mmHg with distilling off the volatile portions, and the mixture was heated with hot water of 38 to 43 C to distill off methylal (during the operation of distilling off, the above nitrogen-oxygen mixed gas was introduced into the system as needed) to obtain the composition of the present invention (300 g) in which 42.9 parts by weight of graft-polymerized particles being the fine polymer particles (B) were dispersed in 100 parts by weight of isobornyl acrylate, i.e. 30 wt % fine polymer particles (B2) were dispersed.

The active oxygen concentration of the obtained composition was 9 ppm, the viscosity at 25 C was 1.4 Pa s and the result of the filtering test was evaluated as passed. Further, this composition was diluted by methyl ethyl ketone, and the volume average particle size of fine polymer particles (B) was measured in the same manner as in Example 11. The volume average particle size was 0.2 μm and the particle size distribution was a sharp monodispersion like (B) in the aqueous latex state.

Comparative Example 11

To 300 g of an aqueous latex containing fine polymer particles (B2) was added 300 g of methyl acetate. After stirring, 210 g of water was further added to reprecipitate the fine polymer particles (B). After separating the liquid phase from the reprecipitated product, 360 g of methyl ethyl ketone was added to the reprecipitated product, followed by stirring for 90 minutes at room temperature. After further mixing 378 g of cyclohexyl acrylate (CHA) as a vinyl monomer (A), under air atmosphere composed of almost 20 vol % of oxygen and 80 vol % of nitrogen, the pressure was gradually reduced to 120 mmHg from 300 mHg with distilling off the volatile portions, and the mixture was heated with hot water of 65 to 70 C to distill off methyl ethyl ketone under reduced pressure (during the operation of distilling off, air was introduced into the system as needed) to obtain the composition of the present invention (461 g) in which 22 parts by weight of graft-polymerized particles being the fine polymer particles (B) were dispersed in 100 parts by weight of cyclohexyl acrylate, i.e. 18 wt % fine polymer particles (B) were dispersed.

The active oxygen concentration of the obtained composition was 90 ppm, and the result of the filtering test was evaluated as passed. Further, this composition was diluted by methyl ethyl ketone, and the volume average particle size of fine polymer particles (B) was measured again by a particle size measuring device (Microtrac UPA manufactured by Nikkiso Co., Ltd.). The volume average particle size was 0.1 μm and the particle size distribution was a sharp monodispersion like (B) in the aqueous latex state.

Comparative Example 12

An aqueous solution of calcium chloride (3 wt %) was added to the fine polymer particles (B3X) in the aqueous latex state to solidify them. The mixture was dried under reduced pressure for three days at room temperature after dehydrating. To the obtained 100 g of powdered fine polymer particles (B3X) was added 300 g of cyclohexyl acrylate (CHA) being the component (A). Though the mixing with a homo mixer was attempted, the mixture became a heterogeneous mixture in a semi-solid state, and it was impossible to process with a homo mixer. Therefore, 880 g of cyclohexyl acrylate (CHA) being the component (A) was added to 100 g of (B3X) again, and mixing and dispersing were continued for two and a half hours at 500 mmHg with keeping the temperature at 70 to 75 C (the temperature of the mixture) and introducing air into the mixture via a Teflon (registered trademark) tube immersed in the mixture, to obtain the composition of Comparative Example 12.

The concentration of the trace amount active oxygen in the composition of Comparative Example 12 was 101 ppm and the result of the filtering test was evaluated as not passed.

Further, a mixture was prepared by diluting 40 g of the composition of Comparative Example 12 with 25 g of methyl methacrylate and 5 g of trimethylolpropane triacrylate, and 0.06 g of N,N-dimethylaniline were added to the mixture. After mixing well, a mixture of 0.8 g of benzoyl peroxide and 10 g of methyl methacrylate was further added thereto, followed by mixing well and pouring into a glass form for curing. A TEM observation of this cured article was carried out in the same manner as in Example 11 and a TEM photograph was obtained. As a result of evaluating the particle dispersion ratio, the particle dispersion ratio was less than 20%.

In Table 4, the relation of core/shell, a breakdown of monomers, a preparation method and an active oxygen concentration of each curable composition sample of Examples 11 and 12, and Comparative Examples 11 and 12 is shown.

TABLE 4

| | Component (A) | Component (B) Core/Shell | Wt % | Preparation method Solvent | Active oxygen concentration (ppm) |
|---|---|---|---|---|---|
| Ex. 11 | CHA | B1 | 15 | Methyl acetate | 18 |
| Ex. 12 | CHA | B2 | 18 | Methyl acetate | 5 |
| Ex. 13 | IBOA | B2 | 30 | Methylal | 8 |
| Com. Ex. 11 | CHA | B2 | 18 | MEK | 90 |
| Com. Ex. 12 | CHA | B3X | 10 | Mixer | 101 |

Comparative Example 13

After adding 300 g of an aqueous latex containing fine polymer particles (B3X) to 300 g of methyl ethyl ketone (MEK) while stirring, water was further added to reprecipitate the fine polymer particles. Though the reprecipitated product was able to be separated from liquid phase, the separated liquid phase was strongly clouded and it suggested that a part of the polymer remained in the liquid phase without being reprecipitated. To this reprecipitated product was added 330 g of MEK, followed by stirring for one and a half hour at room temperature. After further mixing 721 g of cyclohexyl acrylate (CHA) as a vinyl monomer, the pressure was gradually reduced to 120 mmHg from 300 mmHg with distilling off the volatile portions, and the mixture was heated with hot water of 65 to 70 C to distill off MEK under reduced pressure while a small amount of air was introduced as needed to obtain the composition of the present invention (800 g) in which 11.1 parts by weight of fine polymer particles (B3X) were dispersed in 100 parts by weight of cyclohexyl acrylate, i.e. 10 wt % fine polymer particles (B3X) were dispersed.

The concentration of the trace amount active oxygen in the composition of Comparative Example 13 was 86 ppm and the result of the filtering test was evaluated as not passed.

In order to investigate the relation between the active oxygen concentration and the evaluation of storage stability of each curable composition sample of Examples 12 and 13 and Comparative Example 11, a filtering test was carried out before and after a thermal stability acceleration test 1 as to each composition. The results are shown in Table 5.

TABLE 5

| | Component (A) | Component (B) Core/Shell | Active oxygen concentration (ppm) | Filtering test After thermal stability test 1 | Filtering test Before thermal stability test 1 |
|---|---|---|---|---|---|
| Ex. 12 | CHA | B2 | 5 | Passed | Passed |
| Ex. 13 | IBOA | B2 | 8 | Passed | Passed |
| Com. Ex. 11 | CHA | B2 | 90 | Not Passed | Passed |

In order to investigate the relation between the active oxygen concentration and the evaluation of storage stability of each curable composition sample of Examples 12 and Comparative Example 11, a thermal stability acceleration test 2 was carried out as to each composition. The results are shown in Table 6.

TABLE 6

| | Component (A) | Component (B) Core/Shell | Active oxygen concentration (ppm) | Thermal stability test 2 |
|---|---|---|---|---|
| Ex. 12 | CHA | B2 | 5 | Increase in viscosity was observed after five hours |
| Com. Ex. 11 | CHA | B2 | 90 | Increase in viscosity was observed after two hours |

The followings are experimental results regarding the (meta)acrylic adhesive composition of the present invention.

(Composition X1 Containing Fine Polymer Particles (B2))

To 1,000 g of an aqueous latex containing fine polymer particles (B2) was added 1,000 g of methyl acetate. After stirring, 700 g of water was further added to reprecipitate the fine polymer particles (B2). After separating the liquid phase from the reprecipitated product, 1,300 g of methyl acetate was added to the reprecipitated product, followed by stirring for 90 minutes at room temperature. By further mixing 1,580 g of cyclohexyl methacrylate (CHMA) as a vinyl monomer (A) and distilling off methyl acetate under reduced pressure to obtain the composition X1 (1,859 g) in which 17.6 parts by weight of graft-polymerized particles being the fine polymer particles (B2) were dispersed in 100 parts by weight of cyclohexyl methacrylate, i.e. 15 wt % fine polymer particles (B2) were dispersed.

This composition X1 was diluted with methyl ethyl ketone, and the volume average particle size of the fine polymer particles (B) was measured again by a particle size measuring device (Microtrac UPA manufactured by Nikkiso Co., Ltd.). The volume average particle size was 0.2 μm and the particle size distribution was a sharp monodispersion like (B) in the aqueous latex state.

After taking 10 g of the composition X1 and diluting with 10 g of methyl ethyl ketone to make a solution of 20 g in total, the mixture was put through a filter having a mesh of 0.45 μm (membrane material: RC "regenerated cellulose") to carry out a filter evaluation, and all of the solution of 20 g was able to be filtered.

Moreover, in this composition X1, the dispersion state of the fine polymer particles (B2) did not change even after having been left in a light-shielded cool dark place for three months.

(Composition X2 Containing Fine Polymer Particles (B2))

The composition X2 (1,859 g) was obtained in the same manner as in the preparation of the above composition X1 except that 1,580 g of cyclohexyl methacrylate (CHA) was used instead of 1,580 g of cyclohexyl methacrylate (CHMA).

This composition X2 was diluted with methyl ethyl ketone, and the volume average particle size of the fine polymer particles (B) was measured again by a particle size measuring device (Microtrac UPA manufactured by Nikkiso Co., Ltd.). The volume average particle size was 0.2 μm and the particle size distribution was a sharp monodispersion like (B2) in the aqueous latex state.

After taking 10 g of the composition X2 and diluting with 10 g of methyl ethyl ketone to make a solution of 20 g in total, the mixture was put through a filter having a mesh of 0.45 μm (membrane material: RC "regenerated cellulose") to carry out a filter evaluation, and all of the solution of 20 g was able to be filtered.

Moreover, in this composition X2, the dispersion state of the fine polymer particles (B2) did not change even after having been left in a light-shielded cool dark place for three months.

(Composition XC1 Containing Fine Polymer Particles BC1 Used in Comparative Examples)

An aqueous solution of calcium chloride (3 wt %) was added to the fine polymer particles (BC1) in the aqueous latex state to solidify them. The mixture was dried for three days at room temperature after dehydrating. The obtained 120 g of powdered fine polymer particles (BC1) was added in twice to a vinyl monomer mixture as a component (A) of 880 g in total, composed of 325.6 g of cyclohexyl methacrylate (CHMA), 325.6 g of cyclohexyl acrylate and 228.8 g of methyl methacrylate (MMA). Mixing and dispersing the mixture by a homo mixer for two hours were conducted to obtain the composition XC1 (1,000 g) in which 13.6 parts by weight of the fine polymer particles (BC1), i.e. 12 wt % of the fine polymer particles (BC1) were dispersed. During this, since the high temperature mixture may cause a polymerization of methyl methacrylate, the mixture was dispersed while being cooled as needed. Though a small amount of solids was recognized in the mixture, the mixture was used as it was to Comparative Example 21.

After diluting 10 g of the thus obtained composition XC1 with 10 g of methyl ethyl ketone to make a mixture of 20 g in total, the mixture was put through a filter having a mesh of 0.45 μm and a diameter of 25 mm (membrane material: RC "regenerated cellulose"). Due to the generation of clogging, over half of 20 g of the solution was not able to be filtered. Though the filter was changed to the one having a mesh of 0.45 μm and a diameter of 25 mm whose membrane material was PTFE [Teflon (registered trademark)] to attempt the filtering, the result was similarly that the filtering was not possible.

Example 21

To the mixture composed of 5 g of the composition X1 whose component (A) was CHMA, 5 g of the composition X2 whose component (A) was CHA and 3 g of methyl methacrylate as an additional component (A) was added 2.0 g of chlorosulfonated polyethylene (Hypalon 30 (registered trademark) manufactured by DuPont Performance Elastomers LLC) as an elastomer being soluble in the vinyl monomer (A). After leaving the mixture for 24 hours as it was, the uniform mixture was obtained by stirring and mixing. After adding 1 g of methacrylic acid as an ethylenically unsaturated carboxylic acid compound and then stirring, 0.2 g of EPON 828 manufactured by Hexion Specialty Chemicals Inc., being a bisphenol A type epoxy resin, and 0.1 g of cumene hydroperoxide being a radical polymerization initiator were further added. By stirring the mixture, liquid A of a two-component acrylic adhesive was obtained as an adhesive composition of the present invention.

The above obtained 4 g of the composition X1 whose component (A) was CHMA and 4 g of the composition X2 whose component (A) was CHA were put in an another container, and to 8 g in total of this mixture was added and mixed 0.5 g of dihydro phenylpyridine, Reilly PDHP (registered trademark) manufactured by Vertellus Specialty Chemicals Inc., being a co-catalyst to obtain liquid B of a two-component acrylic adhesive.

The thus obtained liquid A and liquid B were mixed in a volume ratio of 1:1 to obtain the adhesive composition of the present invention. By using this adhesive composition, a lap-shearing strength was measured by the above method, and it was 27 N/mm$^2$.

The content of each component of the prepared each liquid is shown in Table 7, with a part by weight assuming that the vinyl monomer (A) is 100 parts by weight. Parts by weight of each component in a mixed liquid are values calculated assuming that the density of both liquids A and B is 1.0 g/mL.

TABLE 7

|  | Example 21 | | | Example 22 | | | Comparative Example 21 | | |
| --- | --- | --- | --- | --- | --- | --- | --- | --- | --- |
|  | Liquid A | Liquid B | Mixed liquid | Liquid A | Liquid B | Mixed liquid | Liquid A | Liquid B | Mixed liquid |
| Vinyl monomer (A) | 100.0 | 100.0 | 100.0 | 100.0 | 100.0 | 100.0 | 100 | 100 | 100 |
| Fine polymer particles (B) | 13.0 | 17.6 | 15.3 | 13.0 | 17.6 | 13.5 | 13.6 | 13.6 | 13.6 |
| Elastomer | 17.4 | 0.0 | 8.7 | 17.4 | 0.0 | 15.7 | 17.5 | 0 | 15.8 |
| Ethylenically unsaturated carboxylic acid | 8.7 | 0.0 | 4.4 | 8.7 | 0.0 | 7.8 | 8.7 | 0 | 7.8 |
| Radical polymerization initiator | 0.9 | 0.0 | 0.5 | 0 | 36.8 | 3.7 | 0 | 36.9 | 3.7 |
| Co-catalyst | 0.0 | 7.4 | 3.7 | 1.2 | 0.0 | 1.1 | 1.2 | 0 | 1.1 |
| Epoxy resin | 1.7 | 0.0 | 0.9 | 1.7 | 0.0 | 1.5 | 1.7 | 0 | 1.5 |

Example 22

To the above obtained composition of 10 g in total, composed of 5 g of the composition X1 whose component (A) was CHMA and 5 g of the composition X2 whose component (A) was CHA were added 3 g of methyl methacrylate as an additional component (A), 2.0 g of nitrile rubber (NBR) (Nipol DN401L (registered trademark) manufactured by Zeon Corporation, combined acrylonitrile amount: 18 wt %) as an elastomer being soluble in the vinyl monomer (A). After having left the mixture for 24 hours, stirring and mixing were conducted to obtain the uniform mixture. To this mixture, 1 g of methacrylic acid as an ethylenically unsaturated carboxylic acid compound and 0.14 g of N,N-dimethyl-o-toluidine as a co-catalyst were added and the mixture was stirred, and further 0.2 g of EPON 828 was added and stirred to obtain liquid A of a two-component acrylic adhesive as an adhesive composition of the present invention.

The above obtained 4 g of the composition X1 whose component (A) was CHMA and 4 g of the composition X2 whose component (A) was CHA were put into an another container, and to 8 g in total of this mixture was added and mixed 2.5 g of benzoyl peroxide paste (Luperox ACT 50 (registered trademark) manufactured by Arkema, Inc., containing 50 wt % of benzoyl peroxide) being a radical polymerization initiator to obtain liquid B of the two-component acrylic adhesive.

The liquid A and the liquid B obtained in the above were mixed in a volume ratio of 9:1 to obtain the adhesive composition of the present invention. By using this adhesive composition, a lap-shearing strength was measured by the above method, and it was 26 N/mm².

Comparative Example 21

To 13 g of the above obtained composition XC1 was added 2.0 g of nitrile rubber (NBR) (Nipol DN401L (registered trademark) manufactured by Zeon Corporation, combined acrylonitrile amount: 18 wt %) as an elastomer soluble into a vinyl monomer (A). After having left the mixture for 24 hours, stirring and mixing were conducted to obtain the uniform mixture. After adding 1 g of methacrylic acid as an ethylenically unsaturated carboxylic acid compound and 0.14 g of N,N-dimethyl-o-toluidine as a co-catalyst and stirring the mixture, 0.2 g of EPON 828 was further added. By stirring the mixture, liquid A of a two-component acrylic adhesive was obtained as the adhesive composition of Comparative Example.

In an another container, to the above obtained 8 g of the composition XC1, 2.6 g of benzoyl peroxide paste (Luperox ACT 50 (registered trademark) manufactured by Arkema, Inc., containing 50 wt % of benzoyl peroxide) being a radical polymerization initiator was added and mixed to obtain liquid B of the two-component acrylic adhesive.

The liquid A and the liquid B obtained in the above were mixed in a volume ratio of 9:1 to obtain the adhesive composition of the present invention. By using this adhesive composition, a lap-shearing strength was measured by the above method, and it was 8 N/mm².

The followings are experimental results as to the anaerobic adhesive composition of the present invention.

Example 31

1-3: Preparation of Diene Rubber Fine Polymer Particles (B31)

Into a pressure polymerizing machine of 100 L were added 200 parts by weight of water, 0.03 part by weight of tripotassium phosphate, 0.25 part by weight of potassium dihydrogen phosphate, 0.002 part by weight of ethylenediaminetetraacetic acid, 0.001 part by weight of ferrous sulfate and 1.5 parts by weight of sodium dodecylbenzenesulfonate. After carrying out a substitution with nitrogen enough to remove oxygen while stirring, 77 parts by weight of butadiene and 23 parts by weight of styrene (100 parts by weight) were added and the mixture was heated to 45 C. While keeping the temperature, 0.015 part by weight of paramenthane hydroperoxide, and subsequently 0.04 part by weight of sodium formaldehyde sulfoxylate were added and the polymerization was started. Four hours after the start of the polymerization, 0.01 part by weight of paramenthane hydroperoxide, 0.0015 part by weight of ethylenediaminetetraacetic acid and 0.001 part by weight of ferrous sulfate were added. Ten hours after the start of the polymerization, the remaining monomer was removed under reduced pressure by evaporating to finish the polymerization. The polymerization conversion rate was 98%. In this manner, the aqueous latex of the rubber-like polymer (SBR) composed of the styrene-butadiene copolymer to be a core polymer, was obtained.

Next, to a glass container of 3 L was charged 1,300 g of the above aqueous latex of the rubber-like polymer composed of the styrene-butadiene copolymer (containing 420 g of styrene-butadiene copolymer as rubber particles being solid contents) and 440 g of purified water was added, followed by heating to 60 C while carrying out nitrogen substitution and stirring. To this aqueous latex of the core polymer mainly comprised of styrene-butadiene rubber was added a mixture composed of a monomer mixture (86 g) of 2.5 g of 4-hydroxybutyl acrylate (4-HBA), 13.7 g of butyl acrylate (BA) and 69.8 g of styrene (St) and 0.4 g of t-butyl hydroperoxide over 120 minutes, followed by a graft polymerization. After finishing the addition of the above-described mixture and stirring for further two hours, the reaction was terminated to obtain the aqueous latex containing fine polymer particles (B31). The polymerization conversion rate was 99%. A part of the fine polymer particles (B31) in the aqueous latex state (506.4 g) was diluted by water, and the volume average particle size was measured by a particle size measuring device (Microtrac UPA manufactured by Nikkiso Co., Ltd.). The volume average particle size was 0.1 μm and the particle size distribution was a sharp monodispersion.

((Meth)Acrylic Monomer Composition Containing Fine Polymer Particles (B31))

To 300 g of an aqueous latex containing fine polymer particles (B31) was added 300 g of methyl acetate. After stirring, water was further added to reprecipitate the fine polymer particles (B31). After separating the liquid phase from the reprecipitated product, 500 g of methyl acetate was added to the reprecipitated product, followed by stirring for 90 minutes at room temperature. After further mixing 255 g of polyethylene glycol (400) dimethacrylate (PEG400DMA) as a vinyl monomer (A) and then distilling off methyl acetate under reduced pressure to obtain the composition of the present invention (340 g) in which 33.4 parts by weight of graft-polymerized particles being the fine polymer particles (B31) were dispersed in 100 parts by weight of PEG400DMA, i.e. 25 wt % fine polymer particles (B31) were dispersed.

This composition was diluted with methyl ethyl ketone, and the volume average particle size of fine polymer particles (B31) was measured by a particle size measuring device (Microtrac UPA manufactured by Nikkiso Co., Ltd.). The volume average particle size was 0.1 μm and the particle size distribution was a sharp monodispersion like (B31) in the aqueous latex state.

After taking 10 g of the obtained composition and diluting it with 10 g of methyl ethyl ketone to make a solution of 20 g in total, the mixture was put through a filter having a mesh of 0.45 μm (membrane material: RC "regenerated cellulose") to carry out a filter evaluation, and all of the solution of 20 g was able to be filtered.

Moreover, the dispersion state of the fine polymer particles (B31) did not change even after having been left in a light-shielded cool dark place for three months.

To 2.76 g of the above prepared (meta)acrylic monomer composition containing the fine polymer particles (B31) were mixed 2.24 g of polyethylene glycol (400) dimethacrylate (PEG400DMA) and 0.3 g of hydroxyethyl methacrylate (HEMA) to obtain a mixture composed of 100 parts by weight of a vinyl monomer (A) composed of 93 parts by weight of PEG400DMA and 7 parts by weight of HEMA, and 25 parts by weight of fine polymer particles (B31). To this mixture were added 0.013 g (0.26 part by weight) of o-benzoic sulfimide as an organic sulfonimide compound, 0.032 g (0.63 part by weight) of N,N-dimethyl-p-toluidine as an amine compound and 0.13 g (2.6 parts by weight) of cumene hydroperoxide as an organic peroxide and dissolved to obtain the anaerobic adhesive composition of the present invention. By using this adhesive composition, a lap-shearing strength was measured by the above method, and it was 4 N/mm².

The content of each component of the prepared adhesive compositions is shown in Table 8, with a part by weight assuming that the vinyl monomer (A) is 100 parts by weight.

TABLE 8

| | Example 31 | Comparative Example 31 |
|---|---|---|
| Component (A): PEG400DMA | 93 | 93 |
| Component (A): Hydroxyethyl Methacrylate | 7 | 7 |
| Fine Polymer Particles (B) or (BC1) | 13.6 | 13.6 |
| Organic Sulfonimide | 0.26 | 0.26 |
| Amine Compound | 0.63 | 0.63 |
| Organic Peroxide | 2.6 | 2.6 |

Comparative Example 31

(Meth)Acrylic Monomer Composition Containing Fine Polymer Particles (BC1)

An aqueous solution of calcium chloride (3 wt %) was added to the fine polymer particles (BC1) in the aqueous latex state to solidify them. The mixture was dried for three days at room temperature after dehydrating. The obtained 200 g of powdered fine polymer particles (BC1) were attempted to be mixed to a mixture of 752 g of polyethylene glycol (400) dimethacrylate (PEG400DMA) being the component (A) and 48 g of hydroxyethyl methacrylate by a homo mixer. However, the mixture had a high viscosity so that the mixing and dispersion by a homo mixer was impossible. Therefore, 120 g of the obtained powdered fine polymer particles (BC1) were newly added in twice to a mixture of 822 g of polyethylene glycol (400) dimethacrylate (PEG400DMA) being the component (A) and 58 g of hydroxyethyl methacrylate while mixing by a homo mixer and dispersed to obtain a mixture composed of 100 parts by weight of a vinyl monomer (A), composed of 93 parts by weight of PEG400DMA and 7 parts by weight of HEMA, and 13.6 parts by weight of fine polymer particles (BC1). During this, since the high temperature mixture may cause a polymerization of polyethylene glycol (400) dimethacrylate, the mixture was dispersed while being cooled as needed. Though a small amount of solids was recognized in the mixture, the mixture was used as it was.

After diluting 10 g of the composition obtained in the above manner with 10 g of methyl ethyl ketone to make a mixture of 20 g in total, the mixture was put through a filter having a mesh of 0.45 μm and a diameter of 25 mm (membrane material: RC "regenerated cellulose"). Due to the generation of clogging, over half of 20 g of the solution was not able to be filtered. Though the filter was changed to the one having a mesh of 0.45 μm and a diameter of 25 mm whose membrane material was PTFE [Teflon (registered trademark)] to attempt the filtering, the filtering was not possible.

To 5.74 g of the above prepared (meta)acrylic monomer composition containing the fine polymer particles (BC1) were mixed 0.013 g (0.26 part by weight) of o-benzoic sulfimide as an organic sulfonimide compound, 0.032 g (0.63 part by weight) of N,N-dimethyl-p-toluidine and 0.13 g (2.6 parts by weight) of cumene hydroperoxide as an organic peroxide. After dissolving, the adhesive strength was measured in the same manner as in Example 31, and the result was 1.5 N/mm², and was inferior to the result of Example 31.

The followings are experimental results as to a photocurable adhesive composition of the present invention.

(Composition Z1 Containing Fine Polymer Particles (B2))

To 1,000 g of an aqueous latex containing fine polymer particles (B2) was added 1,000 g of methyl acetate. After stirring, 700 g of water was further added to reprecipitate the fine polymer particles (B). After separating the liquid phase from the reprecipitated product, 1,300 g of methyl acetate was added to the reprecipitated product, followed by stirring for 90 minutes at room temperature. After further mixing 1,580 g of isobornyl acrylate (iBOA) as a vinyl monomer (A) and then distilling off methyl acetate under reduced pressure to obtain the composition Z1 (1,859 g) in which 17.7 parts by weight of graft-polymerized particles being the fine polymer particles (B) were dispersed in 100 parts by weight of isobornyl acrylate, i.e. 15 wt % fine polymer particles (B) were dispersed.

This composition Z1 was diluted with methyl ethyl ketone, and the volume average particle size of fine polymer particles (B) was measured by a particle size measuring device (Microtrac UPA manufactured by Nikkiso Co., Ltd.). The volume average particle size was 0.2 μm and the particle size distribution was a sharp monodispersion like (B) in the aqueous latex state.

After taking 10 g of the composition Z1 and diluting with 10 g of methyl ethyl ketone to make a solution of 20 g in total, the solution was put through a filter having a mesh of 0.45 μm (membrane material: RC "regenerated cellulose") to carry out a filter evaluation, and all of the solution of 20 g was able to be filtered.

Moreover, in the composition Z1, the dispersion state of the fine polymer particles (B1) did not change even after having been left in a light-shielded cool dark place for three months.

<Compositions Z2 to Z4 Containing Fine Polymer Particles (B2)>

Compositions Z2 to Z4 were obtained in the same manner as in the preparation of the above composition Z1, except that phenoxy ethyl acrylate (PEA) was used in the composition Z2, polyethylene glycol (400) diacrylate (PEG400DA) was used in the composition Z3 and tetrahydrofurfuryl acrylate (THFA) was used in the composition Z4 respectively, instead of isobornyl acrylate (iBOA).

Each of the compositions Z2 to Z4 was diluted with methyl ethyl ketone, and the volume average particle size of fine polymer particles (B) was measured again by a particle size measuring device (Microtrac UPA manufactured by Nikkiso Co., Ltd.). The volume average particle size was 0.2 μm and the particle size distribution was a sharp monodispersion like (B) in the aqueous latex state.

After taking 10 g of each of the obtained compositions Z2 to Z4 and diluting with 10 g of methyl ethyl ketone to make solutions of 20 g in total, the solutions were put through a filter having a mesh of 0.45 μm (membrane material: RC "regenerated cellulose") to carry out a filter evaluation, and all of the solution of 20 g was able to be filtered.

Moreover, the dispersion state of the fine polymer particles (B2) in the compositions Z2 to Z4 did not change even after having been left in a light-shielded cool dark place for three months.

(Composition ZC1 Used in Comparative Example, Containing Fine Polymer Particles BC1)

An aqueous solution of calcium chloride (3 wt %) was added to the fine polymer particles (BC1) in the aqueous latex state to solidify them. The mixture was dried for three days at room temperature after dehydrating to obtain powdered fine polymer particles (BC1).

To a mixture (850 g in total) as a component (A) of 150 g of isobornyl acrylate, 300 g of phenoxy ethyl acrylate, 300 g of (PEG400DA) and 100 g of tetrahydrofurfuryl acrylate (THFA) was added 123 g of fine polymer particles (BC1) in twice, followed by mixing and dispersing by a homo mixer for an hour. During this, since the high temperature mixture may cause an undesirable polymerization of the component (A), the mixture was dispersed while being cooled as needed. In this manner, the composition ZC1 (973 g) in which the fine polymer particles were dispersed was obtained. The ZC1 contained 14.5 parts by weight, i.e. 12.6 wt % of the fine polymer particles (BC1).

After diluting 10 g of the composition ZC1 obtained in the above manner with 10 g of methyl ethyl ketone to make a mixture of 20 g in total, the mixture was put through a filter having a mesh of 0.45 μm and a diameter of 25 mm (membrane material: RC "regenerated cellulose"). Due to the generation of clogging, over half of 20 g of the solution was not able to be filtered. Though the filter was changed to the one having a mesh of 0.45 μm and a diameter of 25 mm whose membrane material was PTFE [Teflon (registered trademark)] to attempt the filtering, the result was similarly that the filtering was not possible.

Example 41

In addition to 12.6 g of the composition Z1 obtained in the above, 25.2 g of the composition Z2 obtained in the above, 25.2 g of the composition Z3 obtained in the above and 8.4 g of the composition Z4 obtained in the above, 2.4 g of isobornyl acrylate, 4.8 g of phenoxy ethyl acrylate, 4.8 g of polyethylene glycol (400) diacrylate (PEG400DA) and 1.6 g of tetrahydrofurfuryl acrylate were further mixed, and 5 g of CD9053 (acid-modified acrylate, manufactured by Sartomer USA, LLC) was mixed thereto to obtain the mixture of 90 g (containing 12 wt % of the fine polymer particles). Even by stirring the obtained mixture at 60 C under air atmosphere, separation of the fine polymer particles and the like was not observed and thus the mixture was stable. To 9 g of the mixture was added 0.36 g of Irgacure 184 (1-hydroxycyclohexyl phenyl ketone) being a photopolymerization initiator, to obtain a photocurable adhesive composition.

This adhesive composition was applied to a part of width of 25 mm and length of 12.5 mm from one end of a glass plate of width of 25 mm, length of 100 mm and thickness of 3 mm, and stuck thereto one end of a PC (polycarbonate) sheet of width of 25 mm, length of 100 mm and thickness of 1 mm (a small amount of glass beads of 100 μm was used for controlling the thickness of the adhesive surface) to give an adhesive surface of width of 25 mm and length of 12.5 mm. By curing this adhesive surface at an accumulated quantity of 610 mJ/cm$^2$ with a metal halide lamp of 120 W/cm by use of UV irradiation equipment (ECS-301, manufactured by EYE GRAPHICS CO., LTD.), a lap-shear test piece was obtained. After having left test piece for 24 hours at room temperature, the adhesive strength of the adhesive test piece was measured according to a method described in JIS-K6850, with defining that the deformation speed at the test was 1 mm/min. and the result was 6 N/mm$^2$.

Example 42

To a mixture of 25 g of the composition Z2 obtained in the above, 50 g of the composition Z3 obtained in the above and 9 g of the composition Z4 obtained in the above was mixed 6 g of CD9053 (acid-modified acrylate, manufactured by Sartomer USA, LLC) to obtain a mixture of 90 g (containing 14 wt % of the fine polymer particles). Even by stirring the mixture at 60 C under air atmosphere, separation of the fine polymer particles and the like was not observed and thus the mixture was stable. To 9 g of the mixture was added 0.36 g of Irgacure184 (1-hydroxycyclohexyl phenyl ketone) being a photopolymerization initiator, to obtain a photocurable adhesive composition.

By using this adhesive composition, a lap-shear test piece was obtained in the same manner as in Example 41. When measuring the lap-shear strength after having left the test piece for 24 hours at room temperature, the result was 8 N/mm$^2$.

Comparative Example 41

To 8.5 g of the composition ZC1 obtained in the above was mixed 0.5 g of CD9053 (acid-modified acrylate, manufactured by Sartomer USA, LLC) to obtain a mixture of 9 g (containing 12 wt % of the fine polymer particles). To this mixture was further added 0.36 g of Irgacure184 (1-hydroxycyclohexyl phenyl ketone) being a photopolymerization initiator, to obtain a photocurable adhesive composition. After having applied this adhesive composition to the similar glass plate as that of Example 41, the adhesive composition was cured in the same manner to obtain an adhesive layer. When measuring the lap-shear strength after having left the test piece for 24 hours at room temperature, the result was 4 N/mm$^2$.

The invention claimed is:

1. A curable composition comprising 100 parts by weight of a vinyl monomer (A) and 0.1 to 100 parts by weight of fine polymer particles (B) having a volume average particle size of 0.05 to 1 μm, said fine polymer particles (B) being dispersed in the form of primary particles in said vinyl monomer (A), wherein said vinyl monomer (A) comprises at least one selected from the group consisting of a (meth)acrylate monomer synthesized from an alcohol having 3 or more carbon atoms and (meth)acrylic acid, a hydroxyethyl(meth)acrylate, an aromatic vinyl monomer and a vinyl ether monomer;

the total amount of the (meth)acrylate monomer synthesized from an alcohol having 3 or more carbon atoms and (meth)acrylic acid and the hydroxyethyl(meth)acrylate in said vinyl monomer (A) is more than 50 wt % and not more than 100 wt %;

said fine polymer particles (B) are particles of a core/shell graft copolymer; and said shell layer comprises a copolymer of 100 wt % in total of shell layer monomers comprising 2 to 90 wt % of at least one monomer (BS-1) selected from the group consisting of an alkoxyalkyl(meth)acrylate, hydroxyalkyl(meth)acrylate and glycidyl(meth)acrylate, 2 to 98 wt % of at least one monomer (BS-2) selected from the group consisting of an alkyl(meth)acrylate, styrene, α-methylstyrene and (meth)acrylonitrile, 0 to 10 wt % of a polyfunctional vinyl monomer (BS-3), and 0 to 10 wt % of other vinyl monomer (BS-4) being copolymerizable with those monomers.

2. The curable composition according to claim 1, wherein an active oxygen concentration in the curable composition is less than 50 ppm.

3. The curable composition according to claim 1, wherein said fine polymer particles (B) are particles of a core/shell graft copolymer comprising at least two layers of an elastic core layer being present inside thereof and a shell layer being present at an outermost side thereof, and said elastic core layer comprises a rubber-like polymer having a glass transition temperature of lower than 0° C.

4. The curable composition according to claim 3, wherein said shell layer monomer comprises styrene as an essential component.

5. A cured article obtained by curing the curable composition according to claim 1.

6. A (meth)acrylic adhesive composition comprising the curable composition according to claim 1, 2 to 50 parts by weight of an elastomer being soluble in said vinyl monomer (A), an ethylenically unsaturated carboxylic acid compound and a radical polymerization initiator, wherein said vinyl monomer (A) comprises, as main components, at least one (meth)acrylate monomer selected from the group consisting of a (meth)acrylate monomer synthesized from an alcohol having 3 or more carbon atoms and (meth)acrylic acid and hydroxyethyl(meth)acrylate.

7. The (meth)acrylic adhesive composition according to claim 6, wherein said vinyl monomer (A) comprises, as a sub-component, a (meth)acrylate monomer synthesized from an alcohol having one or more and two or less carbon atoms and (meth)acrylic acid.

8. A cured article obtained from the (meth)acrylic adhesive composition of claim 6, wherein said fine polymer particles (B) are dispersed in the form of primary particles in the cured article.

9. An anaerobic adhesive composition comprising the curable composition according to claim 1, 0.01 to 12 parts by weight of a hydroperoxide type organic peroxide, 0.01 to 10 parts by weight of an organic sulfimide compound, 0.01 to 3 parts by weight of an amine compound and 0 to 0.2 part by weight of a polymerization inhibitor, wherein said amine compound is at least one selected from the group consisting of N,N-disubstituted arylamines and hydrogenated products of heterocyclic secondary amines, and said polymerization inhibitor is at least one selected from the group consisting of quinones and phenols.

10. The anaerobic adhesive composition according to claim 9, wherein said vinyl monomer (A) comprises at least one (meth)acrylate monomer selected from the group consisting of a (meth)acrylate monomer synthesized from an alcohol having 3 or more carbon atoms and (meth)acrylic acid and hydroxyethyl(meth)acrylate.

11. A cured article obtained from the anaerobic adhesive composition of claim 9, wherein said fine polymer particles (B) are dispersed in the form of primary particles in the cured article of the vinyl monomer (A).

12. A photocurable adhesive composition comprising the curable composition according to claim 1.

13. A process for preparing the curable composition according to claim 1 comprising, in order:

a first step for preparing an aggregate of the fine polymer particles (B) by slow aggregation, a second step for preparing a dispersion by dispersing the fine polymer particles (B) in an organic solvent, and a third step for preparing a curable composition, wherein said third step comprises, in order, an operation for adding said vinyl monomer (A) in the organic dispersion of the fine polymer particles obtained in said second step, and an operation for removing the organic solvent, and said operation for removing the organic solvent in the third step is carried out under gas atmosphere comprising an inert gas and oxygen and having an oxygen content of 2 to 8 vol %.

14. The process for preparing the curable composition according to claim 13, wherein a boiling point of said organic solvent is lower than 60° C.

15. The process for preparing the curable composition according to claim 13, wherein a pressure of said gas atmosphere comprising an inert gas and oxygen is 260 to 650 mmHg.

16. The process for preparing the curable composition according to claim 13, wherein said operation for removing the organic solvent is carried out mainly at 20° C. to 51° C.

\* \* \* \* \*